United States Patent [19]

Moose

[11] Patent Number: 5,166,924

[45] Date of Patent: Nov. 24, 1992

[54] ECHO CANCELLATION IN MULTI-FREQUENCY DIFFERENTIALLY ENCODED DIGITAL COMMUNICATIONS

[75] Inventor: Paul H. Moose, Carmel, Calif.

[73] Assignee: Mercury Digital Communications, Inc., Monterey, Calif.

[21] Appl. No.: 566,290

[22] Filed: Aug. 10, 1990

Related U.S. Application Data

[63] Continuation-in-part of Ser. No. 490,769, Mar. 6, 1990, Pat. No. 5,063,574.

[51] Int. Cl.$^5$ .................... H04L 5/14; H04M 9/08
[52] U.S. Cl. ..................... 370/32.1; 379/410
[58] Field of Search ............ 370/32.1, 32; 379/410, 379/411

[56] References Cited

U.S. PATENT DOCUMENTS

| | | | |
|---|---|---|---|
| 4,799,214 | 1/1989 | Kaku | 370/32.1 |
| 4,868,874 | 9/1989 | Takatori et al. | 370/32.1 |

Primary Examiner—Douglas W. Olms
Assistant Examiner—Wellington Chin
Attorney, Agent, or Firm—Davis & Schroeder

[57] ABSTRACT

A differentially encoded digital signal waveform is generated as a discrete time representation of a desired analog signal utilizing multi-frequency modulation techniques. The computational capability of present day, industry-standard microcomputers equipped with a floating point array processor or digital signal processor chip is utilized to perform digital frequency encoding and compute both discrete Fourier transforms and inverse discrete Fourier transforms to provide a transmitter and receiver system utilizing suitably programmed microcomputers coupled by a communications channel.

5 Claims, 11 Drawing Sheets

ECHO CANCELLATION IN MULTI-FREQUENCY DIFFERENTIALLY ENCODED DIGITAL COMMUNICATIONS

CROSS REFERENCE TO RELATED APPLICATION

This application is a continuation-in-part of copending application Ser. No. 07/490,769 filed on Mar. 6, 1990, now U. S. Pat. No. 5,063,574.

BACKGROUND OF THE INVENTION

The present invention relates generally to communications of digital signals over bandlimited, unequalized, noisy transmission channels at high data rates and, more particularly to the use of microcomputers such as personal computers and the like to accomplish multi-frequency modulation and demodulation for transmission of a multitude of frequencies over a single channel.

In the modern world, computer to computer is quickly becoming the fundamental link for message and data traffic; i.e., information exchange and propagation. In some cases the link is one of many in an extensive network; in others, it may be represented by a single point-to-point communications link. The physical medium constituting the link for transmitting the data may be wire or optical fiber. Or, it may be a microwave or satellite link utilizing radio frequency propagation. (Satellites are also being developed for broadcasting digital audio and digital television signals.) In all cases, the actual signal used to carry the data bits must be a properly modulated analog signal with sufficient energy and of the appropriate frequency to propagate effectively through the channel. Regardless of the form of the link, the objective is to transmit information at a high rate with a low rate of errors from the transmitter to the receiver.

Prior art modulation methods for bandpass channels utilize amplitude and/or phase modulation to carry signal information on a carrier wave in a channel frequency band. When the information source is a finite alphabet, numbers, data, etc., or quantized analog sources such as digitized audio, television, or facsimile, then only a finite number of signal states are required to represent, or code the source.

Digital data is frequently communicated using pulse code modulation techniques at baseband, i.e., in the frequency spectrum from 0 that is to some maximum, or upper frequency limit. If a bandpass transmission is required, i.e., is transmission in a frequency band between an upper frequency and a lower frequency, single side-band (SSB) modulation into and demodulation from the desired frequency band may be employed. For example, polar voltage pulses at 48K bits/sec are filtered to attenuate frequencies above 36 KHz and SSB modulated onto a 100 KHz carrier to fit into the bandpass channel from 60-104 KHz.

Frequency modulation techniques are also employed for digital data. Typically, these involve sending one of two, frequency shift keying (FSK), or one of M (M-ary FSK), frequencies spaced across the available frequency band and may be used in applications where bandwidth efficiency is unimportant as they operate at less than one bit per Hz of available bandwidth.

Alternatively, digital information may be encoded onto a basically analog carrier frequency, centered in the available frequency band, using phase modulation (PSK), differential phase modulation (DPSK), or a combination of phase and amplitude modulation known as quadrature amplitude modulation (QAM). For example, transmission of data over telephone lines designed to carry analog voice frequency signals (VF) is restricted to a frequency band of about 300 to 3500 Hz. Digital modulation of an 1800 Hz carrier frequency using QPSK (2 bits per symbol) or 16-QAM (4 bits per symbol) utilizing a modulator-demodulator device (modem) provides data communication at 4800 and 9600 bits/sec, respectively, when transmitting at a rate of 2400 symbols per second. The unprocessed modulator carrier signal thus provided has a bandwidth substantially greater than the available channel bandwidth so it must be filtered to fit in the available band. These analog filters must be carefully designed so as not to introduce smearing, known as inter-symbol interference (ISI) between adjacent symbol waveforms or the symbols will be decoded in error. A raised cosine filter function is typically employed. Even then, the filtering action of the bandlimited VF channel will introduce ISI due to non-linearities (group delay) in its phase response. These non-linearities are most pronounced at the band edges so that the symbol waveforms must be filtered to the 2400 Hz band from 600 to 3000 Hz before being sent over the channel. The receiving section of the demodulator contains an adaptive filter known as an equalizer in order to remove any residual ISI introduced by the group delay in the 600 to 3000 Hz band. The equalizer must be trained to the particular group delay characteristics of each switched channel connection before any data can be transmitted.

The degree to which the equalization can reduce the ISI on actual circuits limits the number of symbol waveforms that can be distinguished from one another at the receiver and hence limits the number of bits that can be encoded into each baud. A baud is a digitally encoded symbol waveform. In practice it has been found that the combination of ISI and additive noise limit transmission to either two, or under ideal conditions four, bits per baud when transmitting 2400 bauds per second over 2-wire switched telephone circuits.

In order to increase the rate at which data is transmitted, some modems employ multi-frequency modulation (MFM) techniques. MFM utilizes multiple carrier frequencies within the available bandwidth, each frequency independently modulated with digital information in phase and/or amplitude. The frequencies are linearly combined and transmitted as a single digitally encoded waveform, termed a baud, during a finite time interval called the baud interval. U.S. Pat. No. 4,731,816 issued to Dirk Hughes-Hartogs on Mar. 15, 1988 and U.S. Pat. No. 4,601,045 issued to Daniel P. Lubarsky on Jul. 15, 1986 disclose examples of modems employing MFM techniques. Hughes-Hartogs teaches minimizing inter-baud interference by introducing a small guard time between successive bauds during which no signal is sent to prevent received baud overlap. Lubarsky teaches concentrating most of the signal in the center of the baud interval thus causing the signal to taper off to zero near the ends of the baud and minimizing interference between baud intervals by eliminating abrupt changes. If the baud interval is of sufficient duration compared to the guard time or taper time, then the loss of data rate is relatively insignificant.

If the bauds are to be long in duration, then many bits, and consequently many frequencies, may be transmitted in each baud. However, in order to prevent inter-frequency interference, the frequencies must not be spaced too closely. Ideally, the frequencies are made orthogonal over one baud interval. This is known as orthogonal frequency division multiplexing (OFDM). A frequency set will be mutually orthogonal if the frequencies are separated at multiples of the reciprocal of the baud interval. For example, a system employing a rate of 10 bauds per second in the VF band from 300 to 3500 Hz could contain 320 frequencies spaced 10 Hz apart. If each frequency is encoded with 4 bits of information, then 1280 bits will be encoded into each baud and the system will have a throughput rate of 12,800 bits/sec.

The major disadvantage associated with the MFM (OFDM) systems described above is that although they can effectively eliminate inter-baud interference and inter-frequency interference within a baud, they must be demodulated using fully coherent receivers for each frequency in order to obtain the high data rates desired. Since the multitude of frequencies are subject to different and unknown amplitude and phase changes introduced by the transmission channel, these channel properties must be measured during the initiation phase of the communication process and prior to transmission of data. One example of this technique is disclosed by Hughes-Hartogs. Such methods are exceedingly complex and computationally intensive easily rivaling the cost and complexity of adaptive equalization. Furthermore, such OFDM systems will not be effective for direct MFM signalling in bandpass systems such as the 60–104 KHz example described above or in a prototype model of a UHF satellite sound broadcasting system as discussed by Alard et al in "A New System of Sound Broadcasting to Mobile Receivers", presented at the "Centre Commun d'Etude de Telecommunication et Telediffusion" in France and published by the IEEE in 1988.

Differential encoding of the carrier frequencies provides a practical solution to this problem with an attendant 3-db loss of signal-to-noise ratio performance against additive noise. The conventional method to differentially encode information is from baud to baud as is customary in conventional DPSK and as done in the OFDM system disclosed by Alard et al. However, this method produces undesirable results when the baud interval is long, due to channel instability such as that introduced by fading. Further if asynchronous or packet transmissions are utilized there may be a significant reduction of data rate when only two or three bauds are sent since differential encoding in time requires utilizing one baud as a reference.

Frequency differential encoding of multiple carriers was utilized in the HF modem disclosed by Gene C. Porter in "Error Distribution and Diversity Performance of a Frequency-Differential PSK HF Modem", IEEE TRANS. ON COMMUNICATION TECHNOLOGY, 16-4, August 1968, pages 567–575. While frequency differential encoding minimized many of the above described problems encountered with OFDM systems, the circuitry required for generation and demodulation of the signals was unduly complicated and did not reliably maintain the necessary orthogonality between the carrier frequencies.

SUMMARY OF THE INVENTION

The present invention provides a method and apparatus utilizing multi-frequency modulation (MFM) techniques for modulating and demodulating digital information signals for use with bandlimited communications channels. The present invention functions in packet-switched, circuit-switched, or broadcast enviornment and operates with either baseband or bandpass channels. An MFM digital signal waveform is generated as a discrete time, i.e., sampled data, representation of a desired MFM signal using an industry standard microcomputer, such as a personal computer or the like, equipped with a floating point array processor or a digital signal processing (DSP) chip and utilizing a computer software program. For signal transmission, the discrete time signal samples, which are stored in random access computer memory (RAM) as digital words in a time domain array (TDA), are clocked from memory via a suitable input/output (I/O) port of the microcomputer at a clock rate which is a large multiple of the baud rate and which is at least twice the highest frequency to be sent in the MFM analog signal. The digital words are coupled to a digital-to-analog converter (DAC) as a serial data stream for conversion to the desired analog MFM signal for transmission.

The computer program creates the discrete time signal as follows. Digital data to be transmitted are accepted from a message file n bits at a time, differentially encoded and converted to real and imaginary signal values in accordance with the chosen signal modulation constellation for each of the tones. Each encoded n bit work is stored in a position in the lower half of a complex valued frequency domain array (FDA). The complex conjugate of the encoded value is stored in its image position in the upper half of the FDA. Each position in the array is assigned a position number which corresponds to a harmonic of the baud rate of the system. Only those array positions corresponding to desired tones in the MFM signal are filled with modulation values. All other array position values are set to zero.

In the preferred embodiment, K encoded words are placed in adjacent array positions beginning at position $k_1+1$ and ending at position $k_1+K$. Reference values for differential decoding are placed in position $k_1$; this results in an analog signal strictly bandlimited to the band between $k_1-1$ times the baud rate and $k_1+K+1$ times the baud rate. For example, a baud rate of 10 per second, a $k_1$ of 31 and a K of 320 results in a modulated analog signal strictly bandlimited to the band between 300 Hz and 3520 Hz. A baud rate of 250 per second, $k_1$ of 241 and K of 174 results in a modulated analog signal strictly bandlimited to the band between 60,000 Hz and 104,000 Hz. A baud rate of 30 per second, a $k_1$ of 537 and a K of 128 results in a modulated analog signal strictly bandlimited to the band between 16,110 Hz and 19,980 Hz.

A real valued TDA is obtained by operating on the FDA with an inverse discrete Fourier transform (IDFT) algorithm. The values in the TDA are guaranteed to be real because of the complex conjugate image symmetry established in the FDA. The total number of real values in the TDA, designated as $k_x$, is the same as the total number of complex values in the FDA. In a preferred embodiment, $k_x$ is made a power of two and the IDFT is executed using a fast Fourier transform (FFT) algorithm. The TDA contains the discrete time signal representation of one baud of digitally encoded data that consists of the superposition of $k_x/2-1$ tones, or carrier frequencies, each modulated with a phase and amplitude corresponding to the polar representation of the complex number that was stored at its harmonic number in the FDA as described above. The tones are harmonics of the baud rate and are mutually orthogonal on the baud interval. The TDA values are clocked out through the microcomputer I/O port to the DAC at a clock rate of $k_x$ times the baud rate.

In the preferred embodiment where an adjacent subset of K of the $k_x/2-1$ available tones are modulated with information and the others given amplitudes of zero, nK bits are transmitted in each baud. In the 10 baud per second example containing 320 adjacent tones between 300 Hz and 3520 Hz, cited above, $k_x$ of 1024 ($2^{10}$) leads to a clock rate of 10,240 Hz. With n=4 bits encoded into each tone, 1280 bits are sent with each baud for a data rate of 12,800 bits/sec. In the 250 baud per second example containing 174 adjacent tones between 60 KHz and 104 KHz tones, $k_x$ of 1024 leads to a clock rate of 256 KHz. With n=2 bits encoded with each tone, 348 bits of information are sent with each baud for a data rate of 87,000 bits/sec. In the 30 baud per second example containing 128 tones in the band of 16,110 Hz to 19,980 Hz a $k_x$ of 2048 leads to a clock rate of 61,440 Hz. With n=3 bits per tone, 384 bits of information are transmitted with each baud for a data rate of 11,520 bits/sec.

It should be noted from the examples above, and it is a significant feature of the present invention, that bandpass and baseband signals are generated in an identical manner; no further modulation steps are required.

In the preferred embodiment, a time domain packet or array (TDA) is generated for transmission by the computer program of the transmitting microcomputer consisting of the TDA of a synchronization baud followed by the TDAs of L data bauds. A packet transmits L bauds of K tones each modulated with n bits per baud or nLK bits per packet at a data rate of n bits/Hz of occupied channel bandwidth. Overhead comprises one baud for synchronization and one tone for differentially encoding the data in frequency.

Frequency domain differential encoding eliminates the need for correcting the channel amplitude and phase response, i.e., frequency domain equalization as required by the prior art, in the following manner. The tones are spaced at the baud rate. By using a very low baud rate, the tones are very close together and therefore experience substantially the same group delay and attenuation when transmitted through the channel. In the present invention, phase (and/or amplitude) is differentially encoded from tone-to-tone. Differential demodulation at the receiver cancels out unknown phase (and/or attenuation) introduced by the channel. Bulk delay through the channel is accounted for at the receiver with the synchronization baud using a polarity only matched filter to establish the timing reference for the received baud signal samples.

One advantage of utilizing a very low baud rate, i.e., long baud intervals, is that the need for a guard time between bauds, or for tapering the baud signal amplitudes at their beginning and end, i.e., "shoring" as disclosed by Lubarsky, is reduced or eliminated. This is because only a very small fraction of the baud energy is involved in the inter-baud interference. For example, over unequalized telephone lines the variation in delay for tones from 300 Hz to 3500 is only several milliseconds. For bauds of 100 milliseconds or more in length only a small percentage of the baud energy is involved in inter-baud interference. This is not significant when demodulating QPSK constellations (2 bits encoded per tone). Under particularly severe unequalized group delay conditions and or when modulation constellations with more points are selected, a guard time equal to the group delay with zero signal values is inserted between bauds in the TDA.

Demodulation of MFM communication signals is accomplished in a manner that is the inverse of their generation. The received analog signal is sampled by a clock having the same frequency as the transmit clock. Sample values are analog-to-digital (ADC) converted and stored in the receive personal computer memory in a receive TDA. The data are extracted from the TDP one baud at a time. The receive computer program executes a $k_x$ point discrete Fourier transform (DFT) creating a receive FDA. Complex values from the position values in the FDA corresponding to the K+1 tones in the MFM signal are differentially decoded producing K complex values that are stored in a receive digital signal array (DSA). These values are demodulated in accordance with the detection algorithm of the selected modulation constellation to produce the K, n bit words of the baud. The entire packet is decoded by repeating the process for each of the L bauds.

One advantage of differential encoding in frequency is that the receiver clock frequency need not be phase coherent with the transmit clock frequency. Further, small frequency offset errors, on the order of one part in $10^5$, are acceptable with no degradation in performance. The first baud in each packet is utilized as a synchronization baud to establish baud synchronization. Because MFM signals have the statistical characteristics of bandpass white noise, the autocorrelation function of an MFM signal with random input data has a very sharp spike for its central peak. Thus, a polarity-only matched filter matched to a pre-selected synchronization baud which generates a sharp spike at the end of the synchronization baud may be used to initiate data transfer from the ADC to the receive TDP via the selected receive microcomputer computer I/O port. In a preferred embodiment, data is transferred via the direct memory access (DMA) channels in both the transmit and receive microcomputers using the byte transfer mode. For very high speed asynchronous operation, block DMA transfers are preferred.

In some data communications settings, such as computer-to-computer links, full duplex transmission is required, i.e., information nodes which transmit and receive simultaneously. But when operating in the full-duplex mode over the same physical communications medium using the same channel bandwidth and time slots, a node's own transmission can interfere with its reception from the other node. This is generally known as listener echo and is a particular problem in dial-up two-wire public switched telephone circuits. In order to combat this problem, high-speed dial-up modems are equipped with echo cancellers, devices that remove that component of a node's received signal that is due to its own transmission. As much as 75 db of echo suppression may be required in order for a system to achieve 8 bits per Hz of bandwidth efficiency at a signal-to-echo ratio of $-27$ db. The present invention describes a dual-stage, data driven echo cancellation algorithm for MFM that achieves up to 75 db of rejection of near-end echo and up to 35 db of rejection of far-end echo.

The present invention provides an MFM transmitter and receiver which utilizes the computing power available in state-of-the-art industrial standard microcomputers to encode, modulate, demodulate and decode digital data utilizing discrete Fourier transform (DFT) techniques. In a data communications system comprising a transmitting microcomputer and a receive microcomputer linked together via a communications channel, an inverse discrete Fourier transform (IDFT) in the transmit computer and a DFT in the receiver computer are executed as Fast Fourier Transforms (FFT) in real time, the only requirement being that each microcomputer be equipped with readily available floating point array processors. Each microcomputer is coupled to the communications channel via signal converters such as readily available ADC and DAC, respectively, chips. Thus, the present invention provides a "universal modem" in which the bandwidth and data rate are easily controlled by changing parameters in transmit and receive software programs.

Differential encoding of the phase from tone-to-tone eliminates the requirement for a phase-locked or coherent clock reference between the transmit and receive terminals and greatly reduces the signal sensitivity to phase variations introduced in the physical portions of the communications link. Baud synchronization is obtained at the receiving terminal utilizing a simple polarity-only correlator circuit operating on a synchronization baud transmitted as the first baud in each data packet. The amplitudes of the individual tones in the MFM signal can be controlled at the transmit FDA to provide equalization of the frequency-dependent signal-to-noise ratio which may be present in frequency selective channels.

BRIEF DESCRIPTION OF THE DRAWING

A fuller understanding of the present invention will become apparent from the following detailed description taken in conjunction with the accompanying drawing which forms a part of the specification and in which:

FIG. 14b is a diagram illustrating the decoded phase values for the differential encoding strategy shown in FIG. 14a;

DETAILED DESCRIPTION OF THE PREFERRED EMBODIMENT

MULTI-FREQUENCY MODULATION

Figure 1:
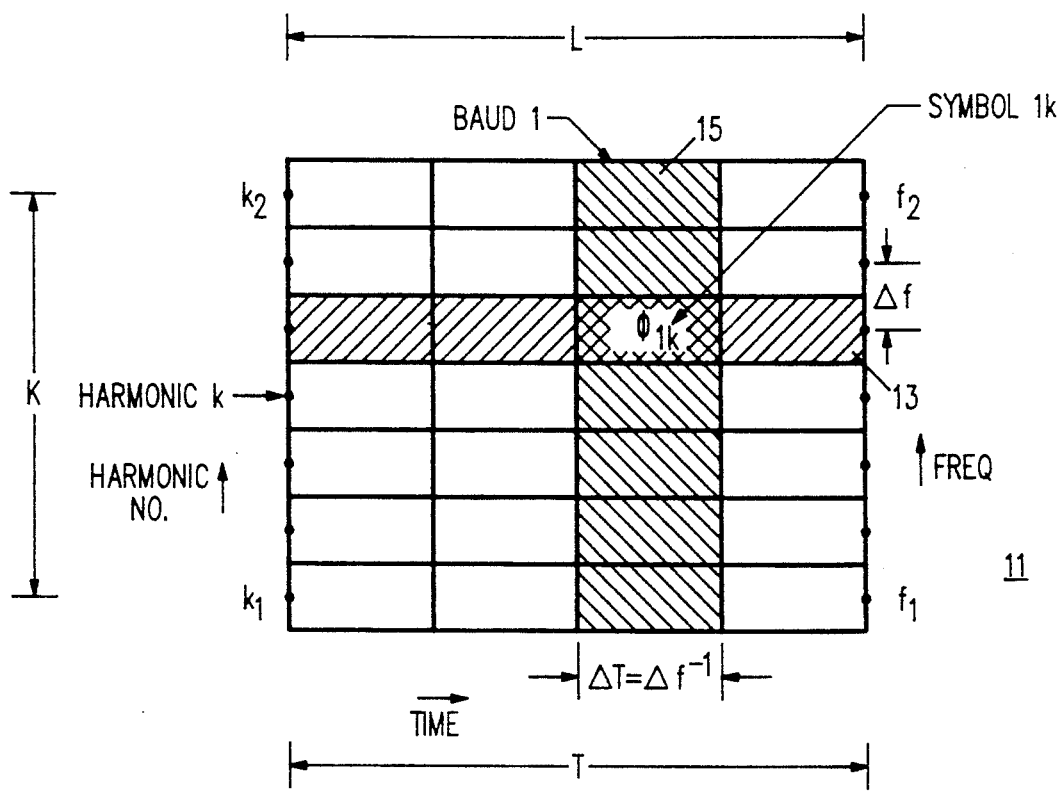
FIG. 1 is a diagram illustrating the relationship between frequency and time for an MFM signal packet.

Referring now to FIG. 1, an analog multi-frequency modulation (MFM) transmit signal generated according to the principles of the present invention comprises "packets" of multiple tones or frequencies which are differentially modulated in amplitude and/or phase between adjacent frequencies. The tones 13 are present simultaneously during a subinterval of the packet 11 known as a baud 15. The packets 11 can be located arbitrarily in the frequency spectrum and in time.

With further reference to FIG. 1, the following terms are defined:

T: Packet length in seconds
$\Delta T$: Baud length in seconds
$K_x$: Baud length in number of samples
L: Number of bauds per packet
$\Delta t$: Time between samples in seconds
$f_x = 1/\Delta t$: Sampling or clock frequency for digital-to-analog and analog-to-digital conversion in Hz.
$\Delta f = 1/\Delta T$: Frequency spacing (minimum) between MFM tones.
K: Number of MFM tones.

Since $\Delta t = \Delta T/k_x$, the sample frequency $f_x = k_x \Delta f$. Consequently, there are a maximum of $k_x/2 - 1$ tones spaced at intervals of $\Delta f$ Hz between $\Delta f$ Hz and less than $f_x/2$ Hz, the Nyquist frequency, that can carry amplitude and phase information during each baud 15. Some, or many, of the tones may not be used (or equivalently have amplitudes of zero) during any or all bauds of the packet. For example, to generate bandpass signals between frequencies $f_1$ and $f_2$, only tones between harmonics $k_1 = f_1/\Delta f$ and $k_2 = f_2/\Delta f$ will be allowed non-zero amplitudes. Here, the maximum number of tones will be $K = k_2 - k_1 + 1$ and the signal bandwidth will be $W = K\Delta f$.

Mathematically the $l^{th}$ baud of the analog transmit signal can be described by;

$$x_l(u) = \sum_k x_{lk}(u) \tag{1}$$

where, $$x_{lk}(u) = A_{lk} \cos(2\pi k\Delta f u + \phi_{lk}); 0 \leq u \leq T. \tag{2}$$

In equations (1) and (2), u is time referenced to the beginning of the baud 15. Actual real time is $t = t_0 + l\Delta T + u$ where $t_0$ is the time of initiation of the $0^{th}$ baud, i.e., the beginning time of the "packet". The discrete time signal corresponding to the $l^{th}$ baud 15 is found by sampling equations (1) and (2) at the sampling intervals $\Delta t = 1/f_x$ and is given by;

$$x_l(n) = \sum_k x_{lk}(n) \tag{3}$$

where, $$x_{lk}(n) = A_{lk} \cos(2\pi kn/k_x + \phi_{lk}); 0 \leq n \leq k_x - 1. \tag{4}$$

In equations (3) and (4), n is discrete time referenced to the beginning of the baud 15. In general, k may take on all integer values between 1 and $k_x/2 - 1$; k is referred to as the "harmonic number" of the MFM tone of frequency $k\Delta f$. A baud 15 interval, i.e., a time $\Delta T$, contains exactly k cycles of tone k. Thus, adjacent tones differ by one in the number of cycles they make during a baud 15.

The $k_x$ point Discrete Fourier Transform (DFT) of equation (3) is given by:

$$X_l(k) = 0 \quad k = 0, k_x/2 \tag{5}$$

and, $$\left. \begin{array}{l} X_l(k) = \tfrac{1}{2} k_x A_{lk} \exp(-j\phi_{lk}) \\ X_l(k_x - k) = \tfrac{1}{2} k_x A_{lk} \exp(j\phi_{lk}) \end{array} \right\} 1 \leq k \leq k_x/2 - 1 \tag{6}$$

The discrete time signal defined by equation (3) is given by the $k_x$ point Inverse Discrete Fourier Transform (IDFT) of equation (5):

$$x_l(n) = \text{IDFT}[X_l(k)]; 0 \leq k, n \leq k_x - 1. \tag{7}$$

To summarize, the $l^{th}$ baud 15 is generated by taking the IDFT of a complex valued array of length $k_x$ called the frequency domain array (FDA). The first half of the array is loaded with the amplitudes and phases of the tones to be included in the MFM signal at the corresponding harmonic numbers. The second half of the array is loaded with the complex conjugate of values in the first half of the array at the image harmonics (the image harmonic of k is $k_x - k$). The resulting data structure is shown for $k_x = 16$ in Table 1. The complex conjugate symmetry about the midpoint insures that the IDFT, also an array of $k_x$ points called the time domain array (TDA), will be real valued. The values in the TDA, $x_l(n)$, defined by equation (7) comprise the discrete time samples for the digitally modulated analog MFM transmit signal waveform.

TABLE I

| k | Re{X(k)} | Im{X(k)} |
|---|---|---|
| 0 | 0 | 0 |

TABLE I-continued

| k | Re{X(k)} | Im{X(k)} |
|---|---|---|
| 1 | 0 | 0 |
| 2 | 0 | 0 |
| 3 | XR3 | XI3 |
| 4 | XR4 | XI4 |
| 5 | XR5 | XI5 |
| 6 | 0 | 0 |
| 7 | 0 | 0 |
| 8 | 0 | 0 |
| 9 | 0 | 0 |
| 10 | 0 | 0 |
| 11 | XR5 | −XI5 |
| 12 | XR4 | −XI4 |
| 13 | XR3 | −XI3 |
| 14 | 0 | 0 |
| 15 | 0 | 0 |

Figure 2A:
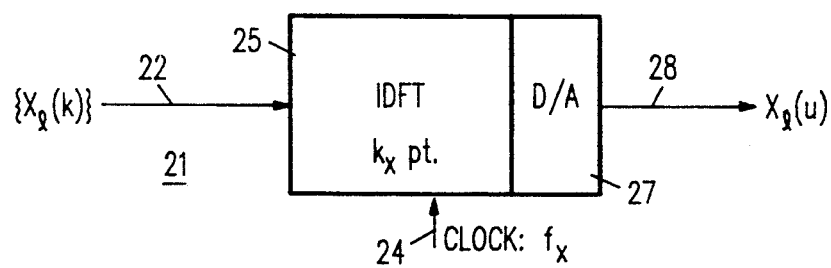
FIGS. 2a and 2b are conceptual block diagrams illustrating the transmitter and receiver sections, respectively, for an MFM communication system according to the principles of the present invention.
Figure 2B:
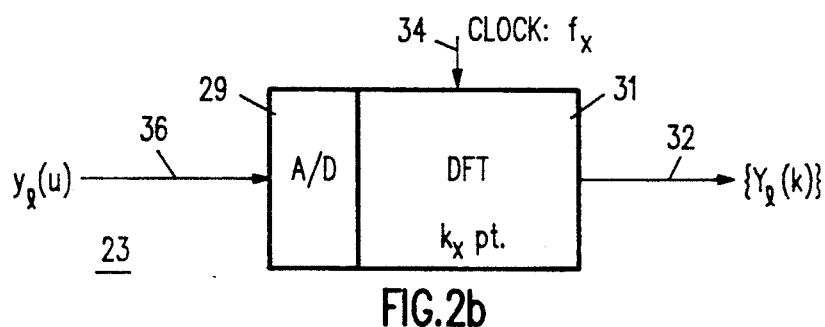

Referring now also to FIGS. 2a and 2b, a block diagram of a transmitter section 21 and a receiver section 23, respectively, are shown. The $k_x$ point DFT of $x_1(n)$, as defined by equations (5) and (6), i.e., the complex valued FDA is loaded on line 22 into the IDFT block 25 to provide a set of discrete time samples in the TDA corresponding to the desired MFM analog transmit signal. The samples are clocked out via DAC 27 at a clock frequency 24 of $f_x$ to provide the desired analog transmit signal $x_1(u)$ on line 28. A complete signal packet 11 is generated by L repetitions of the above described process.

Demodulation of MFM is the inverse of the signal generation process. The received analog signal, $y_1(u)$, on line 36 at the receiver 23 is sampled at the clock 34 frequency, $f_x$ samples per second, and converted to a digital format via ADC 29. The sampled values are loaded into a $k_x$ point real valued array, called the receive time domain array (TDA), in DFT block 31. A DFT is computed of the array to obtain the complex valued frequency domain array (FDA) of the sampled input on line 32. The $k_x$ point DFT yields the complex valued receive FDA, $Y_1(k)$, containing, in its first half, the amplitude and phase modulation information, $A_{1k}$ and $\phi_{1k}$, of all the harmonics of the transmit signal waveform.

If the non-linear nature of ADC 29 is ignored, the demodulation operation can be considered linear. Only K out of the $k_x$ complex values are retained for decoding. Also, the upper half of the receive FDA is redundant; it contains the complex conjugates of the values at the image frequencies in the lower half of the array and is not retained for processing. Also, non-used harmonics in the lower half of the array will, in the absence of noise, contain zero values and can be discarded. When they do contain noise values, their discard is equivalent to filtering out the unused portion of the spectrum at the output of the demodulation stage. Alternatively, the noise values may be used to estimate the noise level in the system.

As shown by equations (8) and (9), derived in a well-known manner from equations (2) and (4), the tones 13 are all orthogonal; in discrete time on the interval $0 \leq n \leq k_x - 1$, and in continuous time on the interval $0 \leq u \leq \Delta T$.

$$\int_0^{\Delta T} x_k(u) x_i(u) du = \begin{array}{l} 0; k \neq i \\ \tfrac{1}{2}(A_k)^2 \Delta T; k = i \end{array} \tag{8}$$

-continued $$\sum_{n=0}^{k_x-1} x_k(n)x_i(n) = \begin{cases} 0; k \neq i \\ \frac{1}{2}(A_k)^2 k_x; k = i \end{cases} \quad (9)$$

Signals in different bauds are orthogonal, since they do not overlap in (real) time. Thus, the K tones of the L bauds form a set of LK orthogonal signals so that the response of a matched filter, or correlator, to any of the tones (regardless of its modulation) other than the one to which it is matched is zero. Since the receiver 23 is linear, and a matched filter assures that it is optimal for demodulation of MFM, the signal-to-noise ratio is maximized in the presence of additive white noise. This is so in spite of unknown communication channel or line attenuation at each of the frequencies. The channel need only have constant attenuation over narrow frequency bands corresponding to the bandwidths of the individual tones, $\Delta f$, and not over the entire bandwidth W. Thus the demodulation is still optimal for a wideband signal propagating through a channel with substantial variation in gain across the band.

Modulation

Modulation of the MFM signal can be uniquely accomplished in a number of ways. The signal $x_1(n)$, as defined in equation (3), can be modulated in amplitude, frequency and phase, by translating the data into changes in $A_{1k}$, k and $\phi_{1k}$ respectively. However, any combination of the modulation types is also possible, such as changing amplitude and phase to produce quadrature amplitude modulation (QAM). The MFM signal can be bandpass or baseband and through further multiplication with a carrier frequency, $x_1(n)$ can be translated to any frequency band desired. Bandpass signals modulated using quadrature phase shift keying (QPSK) and differential quadrature phase shift keying (DQPSK) are described in detail hereinbelow.

Figure 3:
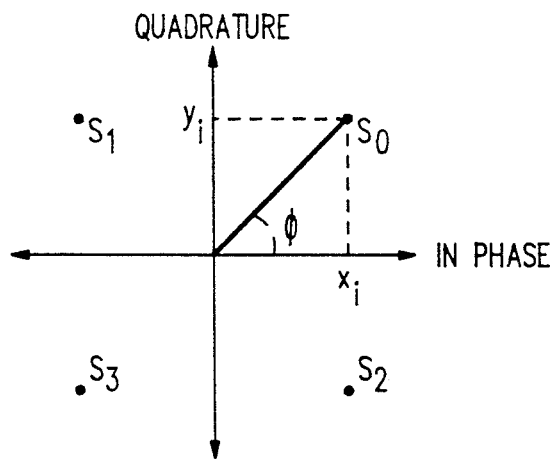
FIG. 3 is a diagram illustrating the complex envelope for one QPSK tone.
Figures 4A, 4B:
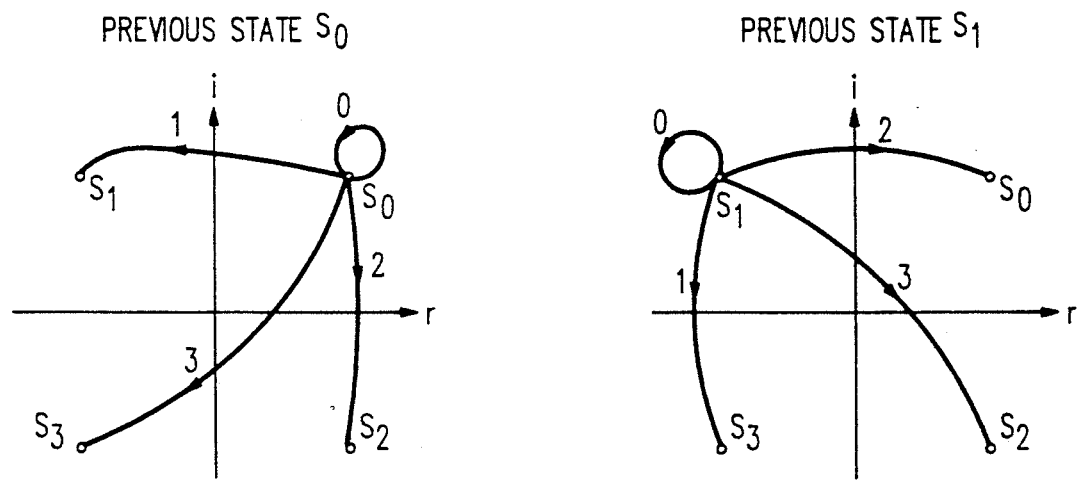
FIGS. 4a–4d are phase plot diagrams illustrating the phase encoding for DQPSK encoding.
Figures 4C, 4D:
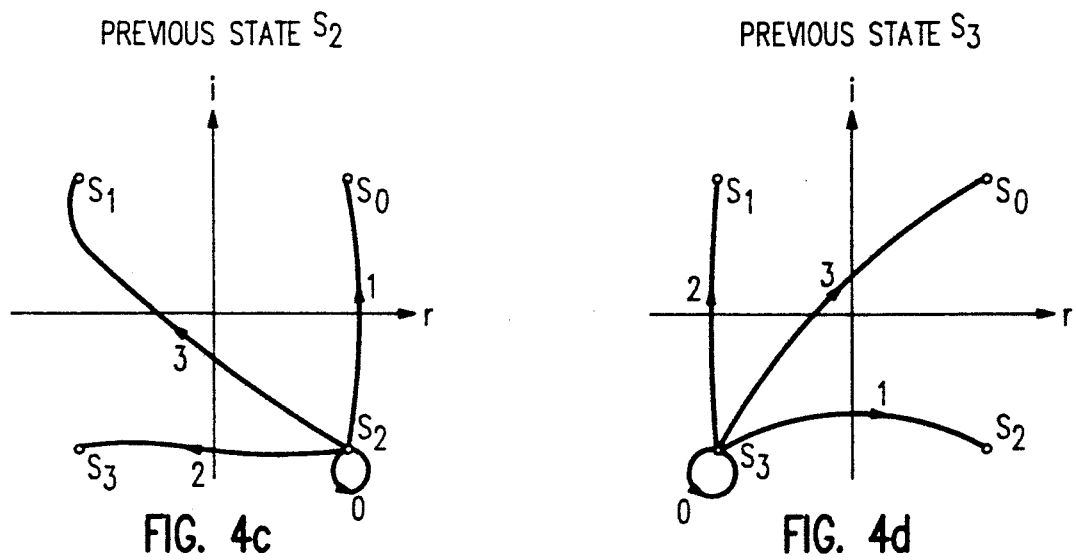

Conventional QPSK converts a digital input into four modulation voltage levels (symbols) to determine the phase of the transmitter output. To minimize the probability of symbol error the phases are spaced at multiples of $\pi/2$. A plot of the complex envelope of one tone of $x_1(n)$ is shown in FIG. 3. The angle $\phi$ can take on the values of $\pm\pi/4$ and $\pm 3\pi/4$.

Encoding MFM with QPSK is accomplished by loading the complex frequency domain array with the appropriate phase information. For example, if the digital input is '0110 . . . '. The first di-bit or symbol, '01', would be loaded into the frequency bin, k, as $\text{Re}[X(k)] = -A_k k_x/2(2)^{\frac{1}{2}}$ and $\text{Im}[X(k)] = -\text{Re}[X(k)]$ where $A_k$ is the amplitude of tone k. Similarly, the second symbol '10' would be loaded into the second bin, k+1, as $\text{Re}[X(k+1)] = A_{k+1}k_x/2(2)^{\frac{1}{2}}$ and $\text{Im}[X(k+1)] = -\text{Re}[X(k+1)]$. This continues until all the tones in the baud are filled or there are no more symbols. As described above, the discrete time domain signal is produced by taking the IDFT of the complex frequency domain array. Each successive baud is encoded similarly.

Decoding QPSK directly into bits is accomplished easily as follows. Assuming a coherent receiver, decoding requires evaluation of the polarity of the real and imaginary components of the K complex values stored in the receive frequency domain array. As shown in FIG. 3, the symbol mapping uses Gray encoding. This reduces the probability of bit error as errors caused by AWGN are likely to occur when the adjacent symbol is selected for the transmitted symbol; thus, the symbol error will contain only one bit error. Gray encoding also allows decoding directly into di-bits, with the right bit determined by the polarity of the real component and the left bit by the polarity of the imaginary component. The digital data is obtained by successively decoding each tone of each baud.

Conventional QPSK requires strict phase coherent regeneration of the sampling frequency to eliminate phase ambiguity. This results in a complex synchronization design or distribution of the multitude of carrier frequencies to each receiver. MFDQPSK provides a practical solution to the phase uncertainty problem by translating the original symbol set into a second "differential" symbol set, or set of states which can be evaluated to provide a set of modulation values, which is then encoded as QPSK. Translated symbols are generated based on the input symbol and the previous translated symbol. FIGS. 4a-4d illustrate this translation. As shown, regardless of the previous symbol, an input of '00' generates a new symbol in the same quadrant as the previous symbol. An input of '01' rotates the new symbol $+\pi/2$ radians from the previous, '11' rotates $\pi$ radians, and '10' rotates $-\pi/2$. In the receiver, decoding is performed by determining the phase difference between successive pairs of tones.

In the absence of noise, the phase difference will be 0, $\pm\pi/2$ or $\pi$ radians. To realign the phases to the orginal QPSK constellation $+\pi/4$ radians is added to the phase differences and the quadrature components of the complex representation of the result are decoded as with QPSK; i.e., the polarity of the real part determines the right hand bit and the polarity of the imaginary part determines the left hand bit.

MFM SYSTEM

Referring now to FIGS. 5-8, FIG. 5 is a functional block diagram of an MFM communications system according to the principles of the present invention. The MFM communications system of the present invention comprises a transmitter section 51 wherein digital data input on line 62 is modulated in a desired frequency band to provide an MFM analog transmit signal which is coupled to a communications channel 55 for propagation to a receiver section 53. The receiver section 53 demodulates the received analog signal including any noise introduced in the communication channel 55 to provide the original source data output on line 66 in digital form. The input data on line 62 may be any information or message which may be represented in a digital format. While the modulation and transmission process is preferably in real time, input information can be processed and stored as a time domain array (TDA) in the system memory for transmission at a later time. All modulation/demodulation and encoding/decoding functions are performed entirely internally by industry standard microcomputers, such as personal computers (an IBM AT Personal Computer including a floating point array processor is suitable for this application), under the control of special purpose transmit and receive computer programs thereby eliminating the need for special purpose modems to translate between the digital and analog domains. The transmit microcomputer 57 is coupled to the communication channel 55 via its I/O ports 63 and DAC 65. The receive microcomputer 59 is coupled to the communications channel 55 via ADC 67 and its internal I/O ports 71. Matched filter 69 provides baud synchronization within each packet. The communications channel 55 may be any available communications link linking the transmit 57 and the receive 59 microcomputers together. The medium for transmitting the data may be wire or optical fiber, or it may be radio frequency such as HF, microwave or satellite.

Figure 6:
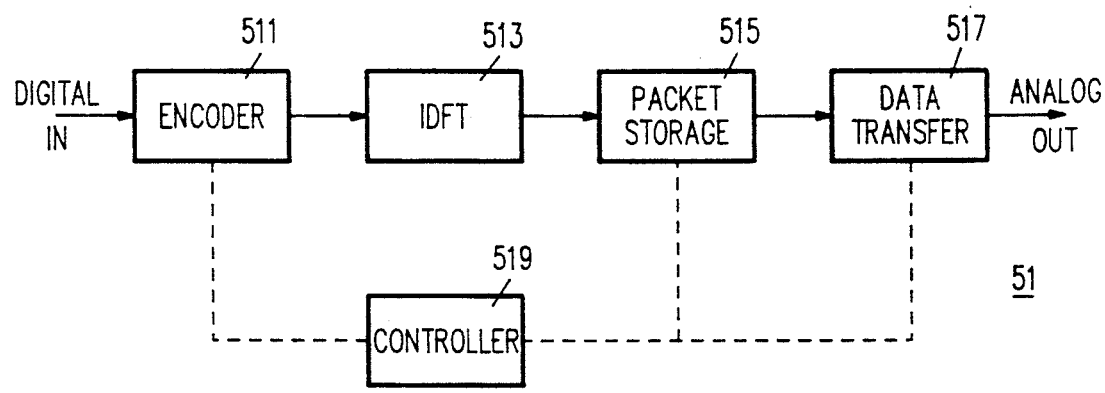
FIG. 6 is a functional block diagram of the transmitter block shown in the block diagram of FIGS. 2a and 5.

FIG. 6 is a functional block diagram of the transmitter section 51. As described above, the input data is processed and may be transmitted immediately, i.e., in real time, or stored for transmission at a later time. The digital input to the encoder 511 is a serial string of a binary digits. Processing by the encoder 511 is performed on a baud by baud basis until the end of the data file or the maximum packet length has been obtained. The encoder 511 encodes the input data words or symbols into complex valued symbols which are stored in a frequency domain array (FDA), a file defined in the system memory (not shown). The value of the input symbols is a function of the type of modulation. For example, QPSK symbols correspond to two-bit, or dibit, words and are encoded as discussed hereinabove. A discrete signal is produced by computing the IDFT 513 of the complex valued FDA array and is loaded into the packet storage area 515 in a time domain array (TDA). The controller 519 determines the parameters of the packet based on the modulation type, baud rate and message size. The controller sequences the input data through the transmitter section 51 one baud at a time until the entire message has been processed. Once processed, the entire stored digital signal, $x_1(n)$, is transferred from the TDA at a selected clock rate, $f_x$ samples per second, through DAC 517. Depending on the communication channel 55 frequency response, filtering of the analog output signal may be desired to remove high frequency amplitude discontinuities introduced by DAC 517.

Figure 7:
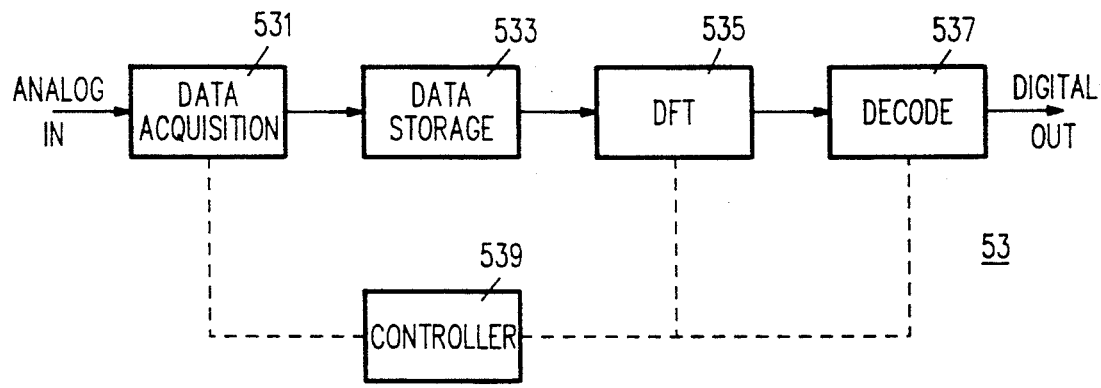
FIG. 7 is a functional block diagram of the receiver block shown in the system of FIGS. 2b and 5.

FIG. 7 is a functional block diagram of the receiver section 53. The data acquisition board 531 samples the input analog signal at the clock rate $f_x$ samples per second, and converts it to a digital format via ADC 67. Filtering of the analog input signal may be required to bandlimit input noise and to reject out of band interference from frequencies greater than $f_x/2$. The digital data sequence thus obtained is stored as a time domain packet or array (TDA) in the receive microcomputer 59 data storage 533. The stored real value data sequence is accepted from the receive TDA one baud at a time to perform a $k_x$ point DFT 535. The first half of the resulting complex values are decoded in decode block 537 to obtain the amplitude and phase modulation information. In a manner similar to the transmit section 51, the receiver section controller 539 sequences the data through the receive section 53.

As a function of the processing speed and capacity of the receive microcomputer 59, some delay may be introduced to the receive section from input to output. For real time processing, the receive microcomputer 59 must have the capability to complete the $k_x$ point DFT 535 in the same or less time than it takes to fill up one baud length buffer in the receive TDA. In a microcomputer utilizing parallel TDP buffers, data processing can alternate between buffers and data flow will be continuous through the system at the sampling rate. The storage requirements and processing time per packet for a clock rate of $f_x=61,440$ Hz, L=30 bauds in a packet and $k_x=1024$ samples are given in Table II for a receiver system with a real time and a non-real time DFT processing capability.

TABLE II

| | Real Time | Non real time |
|---|---|---|
| Storage required (# of samples) | 2048 | 30720 |
| Time required for processing 1024 samples (msec) | ≦16.7 | >16.7 |

For the MFM system of the present invention, carrier frequency synchronization is not required because of the differential encoding. In the preferred embodiment, the MFM signal is implemented in the form of a transmission packet. To acquire the packet, the receiver section 53 must know when to start sampling. This is accomplished by packet synchronization. Typically, unique words are inserted to mark the start of each packet or frame. In the preferred embodiment, the unique word is termed a "synchronization baud", and is added at the beginning of each packet. The synchronization baud is generated similarly to the other bauds in the packet, except that the tones and phases are predetermined. Acquisition of data by the receiver section 53 commences after successful detection of the synchronization baud.

Figure 5:
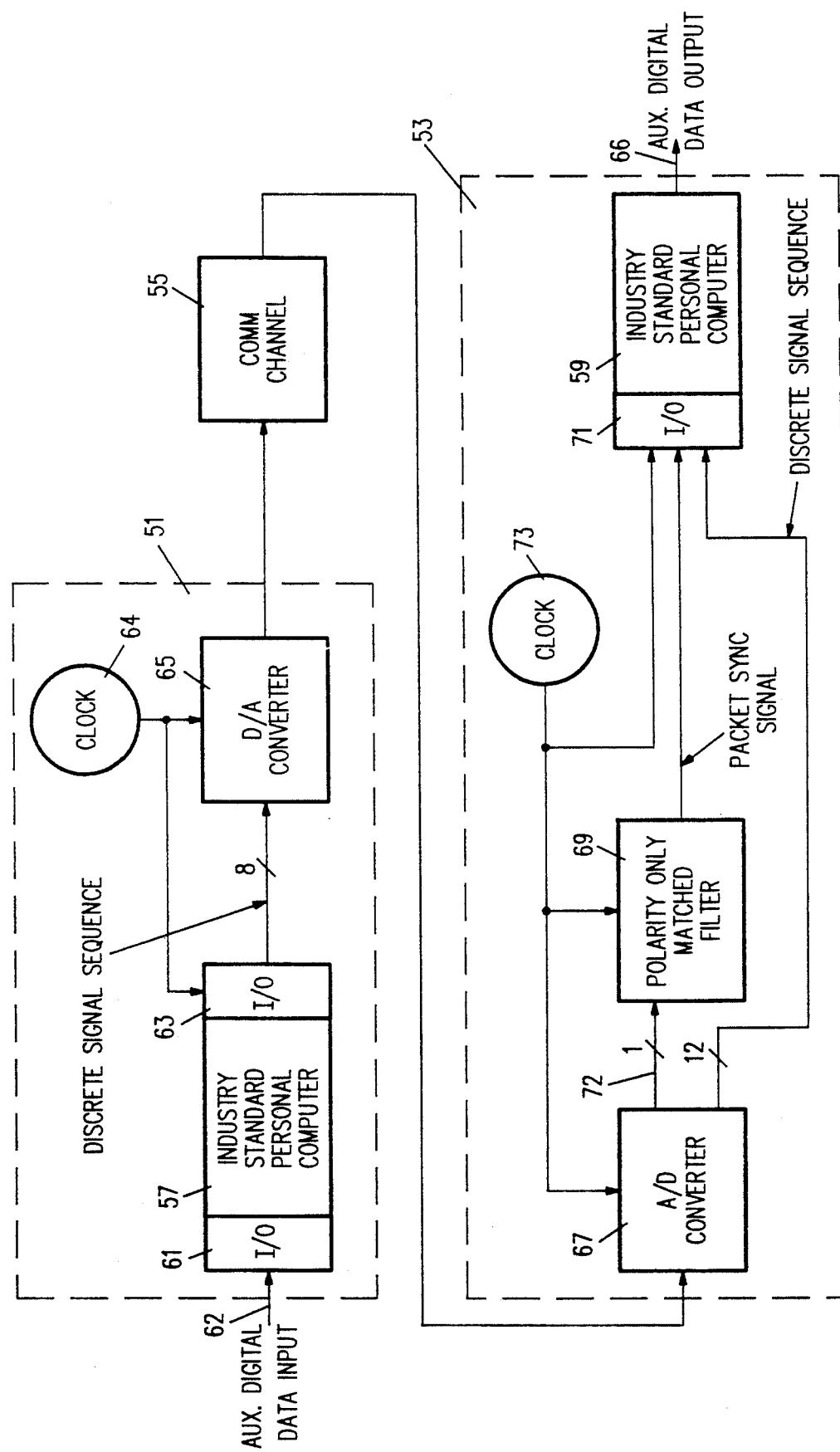
FIG. 5 is a functional block diagram of an MFM communications system according to the principles of the present invention.

FIG. 6 is a detailed block diagram of the data acquisition board 531 for the receive section 53. Frame synchronization of DQPSK MFM in the present invention is achieved utilizing a polarity-only matched filter or polarity coincidence correlator. The data acquisition board 531 comprises ADC 67 which couples a 12-bit digital data signal on line 541 to AND gate 547 and also couples a single bit signal on line 542 to the matched filter 69 (as shown in FIG. 5). The matched filter 69 provides sampling triggers to the AND gate 547 synchronized with respect to the time of arrival of the input data packet. Using the polarity of the analog input, coupled as a single bit on line 542, it functions as a matched filter to the last half of the 256 point synchronization baud. The hard limiter 544 comprises a fast, high precision, high gain operational amplifier utilized to obtain the polarity information in the analog input signal. During the positive and negative portions of the one-bit digital input on line 542, the output of the hard limiter 544 is positive and zero, respectively. This unipolar signal is synchronized to the receiver section 53 clock frequency, $f_x$, as it is clocked through a 128 point polarity-only matched filter 543. To minimize bit instability the hard limiter 544 slew rate should be as large as possible. (an LM 318 general purpose operational amplifier having a slew rate of 70 volts per microsecond is suitable for this purpose.)

In the preferred embodiment, the polarity-only matched filter 543 described above is realized by a commercially available CMOS programmable digital correlator comprising four, 32-bit correlator modules in series to form a 1×128-bit fixed channel configuration. A single bit is clocked in from ADC 67 on line 542 to be compared against a 128-bit preloaded reference pattern. A match occurs when the synchronization baud for each packet in the received signal is clocked through ADC 67 (a TMC2221 TTL compatible CMOS correlator manufactured by TRW LSI Products Inc. is suitable for this purpose.) A synchronization trigger generated when a match occurs enables D flip-flop 548 to couple sampling triggers to AND gate 547 for data acquistion at the beginning of each data packet as required for the demodulation process.

In the preferred embodiment, the MFM communications system of the present invention may be implemented in a variety of ways utilizing various software and hardware configurations. To provide maximum I/O channel throughput, the host computer direct memory access (DMA) is utilized. Any desired packet construction may be used and various baud rates are available to provide greater flexibility in adapting the packet to available channel parameters. For example, in MFDQPSK modulation, where the information is represented by the phase difference between adjacent tones, channel tone distortion affects a shorter baud more than a longer baud due to the greater tone spacing. A longer baud is preferred when differential encoding is between adjacent tones. A short duration baud is desirable with differential coding between the same tones on adjacent bauds.

Figure 9:
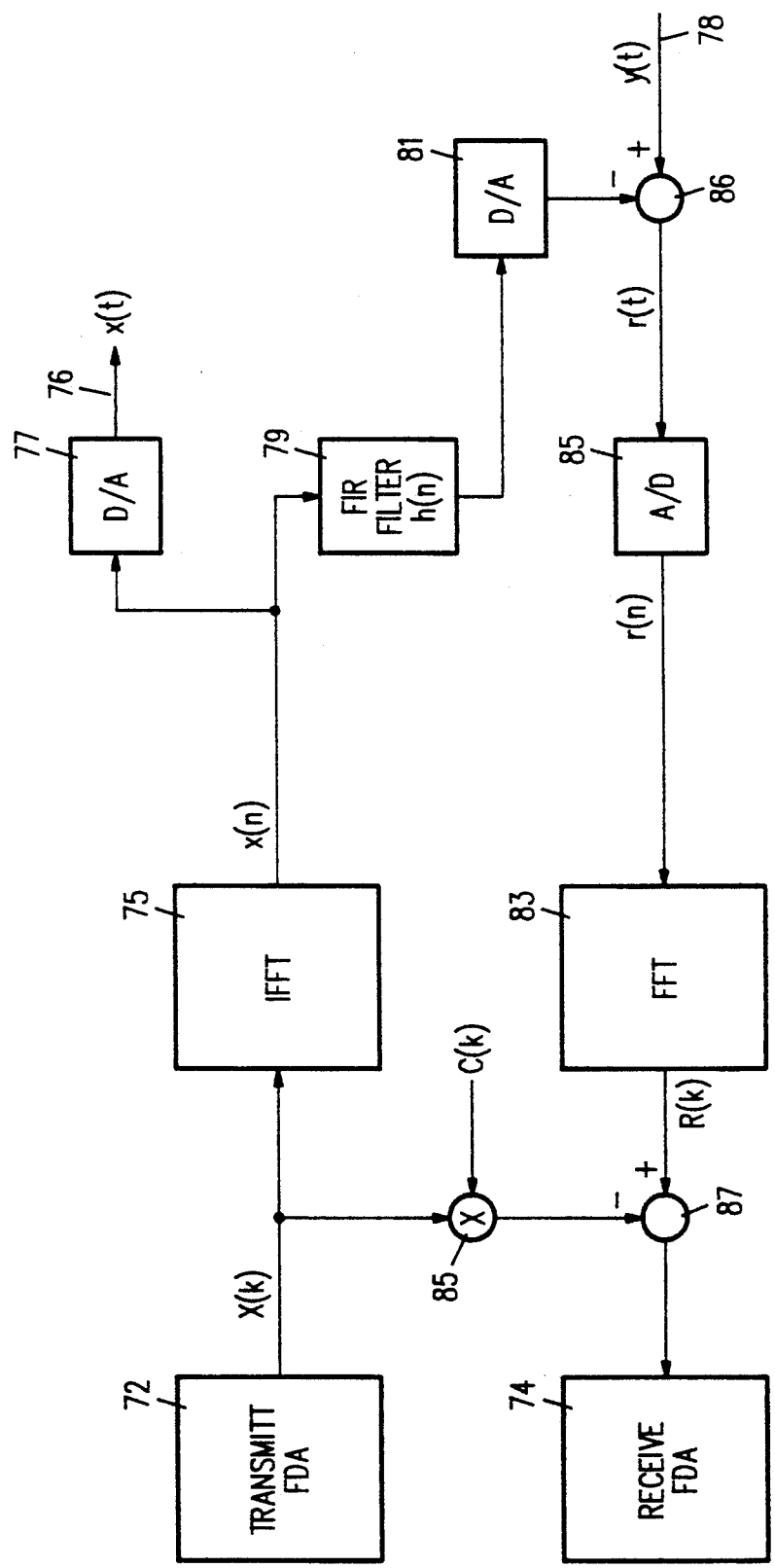
FIG. 9 is a functional block diagram of a data-driven echo cancellation circuit for a full-duplex communication system according to the principles of the present invention.

Referring now to FIG. 9, a two-stage, data driven echo canceller (EC) 70 according to the present invention makes use of a unique and important feature of MFM, namely that data is available during the encoding/modulation process and during the signal transmitted demodulation/decoding process both as digital time domain sequences and as frequency domain arrays. The first stage of the EC 70 uses a finite impulse response (FIR) linear filter h(n) 79 driven by the transmit time domain digital signal sequence x(n) output by the IDFT 75 to generate a first estimate of the echo signal. This first echo estimate is coupled via DAC 81 to summer 86 at the channel input 78 and subtracted from y(t), the received analog signal prior to its analog to digital conversion. The pre-conversion cancellation of the received echo reduces the dynamic range requirement for the receive ADC 85 to a maximum of 14 bits. The first stage utilizes the same x(n) data which is transmitted on the channel 76 via DAC 77.

The second stage of the EC 70 comprises multiplier 85 and summer 87 and operates in the digital frequency domain using the transmit frequency domain array X(k) 72 as the data driver. The complex values in the transmit frequency domain array are multiplied by complex coefficients C(k) at multiplier 85 to generate an estimate of the residual echo that remains after the first stage of cancellation. This refined estimate is subtracted from R(k), the values in the receive frequency domain array 83. The second stage of EC 70 cancels residual near-end and far-end echo whereas the first stage of the EC is aimed primarily at reducing the near-end echo.

The coefficients h(n) and C(k) for both stages of the EC are established using a training packet prior to the beginning of data exchange. The algorithms for computing the coefficients are described below. The two nodes are trained sequentially. That is, the call initiating modem transmits a training packet that is utilized to adapt its echo canceller with the answering modem connected, but not transmitting. Then, the answering modem trains its EC with the calling modem connected but not transmitting. Any other echo cancellers or echo suppressors in the link are disabled. After both ECs are trained, full-duplex data exchange proceeds using the aforementioned differentially encoded MFM signals.

Figure 10:
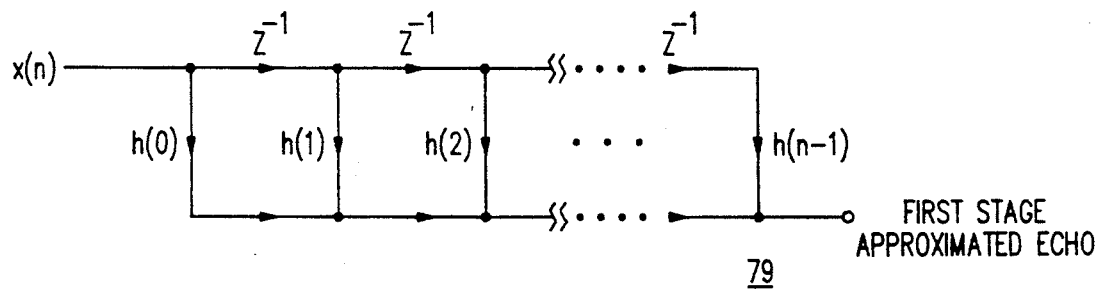
FIG. 10 is a diagram illustrating the first stage echo cancellation training algorithm for the echo cancellation circuit shown in FIG. 9.

Referring now also to FIG. 10, algorithms are described for training each stage of the EC. The first stage of the EC is trained using the first baud of the training packet. As shown in FIG. 1, a baud 15 is of length $\Delta T$ seconds and contains $k_x$ digital signal samples. The second stage of the EC is trained using the remainder of the bauds in the training packet with the first stage EC in operation. Thus the training packet must contain at least two bauds but may contain more to improve the estimate of the residual echo. In one preferred embodiment, the training packet contains 8 bauds. Two embodiments for computing the N filter coefficients are given by Iterative Algorithm $$h^{n+1}(i) = h^n(i) + k_x^{-1}(r(n)x(n-i)); \quad (10)$$

$$i = 0, 1 \ldots N - 1; n = 0, 1 \ldots k_x - 1;$$

and

Smoothed Algorithm $$h(i) = \sum_{n=0}^{k_x-1} r(n)x(n-i) / \sum_{n=0}^{k_x-1} x^2(n); \quad (11)$$

$$i = 0, 1, \ldots N - 1.$$

In all cases, N, the number of coefficients in the first stage echo canceller, must be very much less than $k_x$, the number of sample points in a baud. In one preferred embodiment, $N=1$ and $k_x=1024$. However, all FIR filters used in conjunction with MFM digital data transmission echo cancellation. Both equations (10) and (11) are LMS (least mean square) type algorithms and are effective for echo cancellation; equation (11) is more computationally intensive than equation (10) but in general results in slightly more echo reduction.

Figure 11:
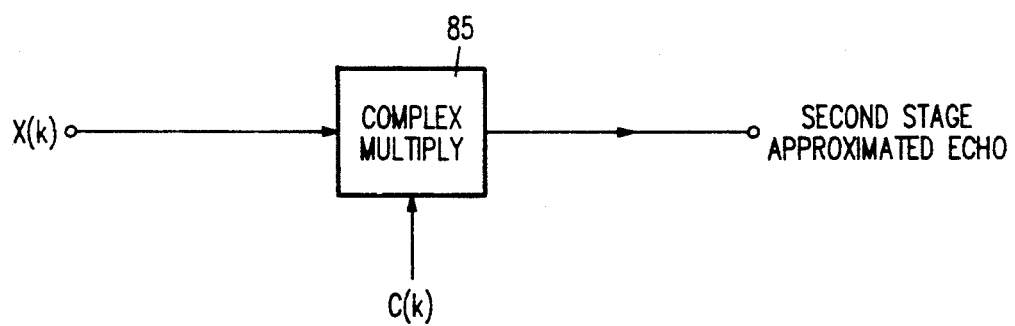
FIG. 11 is a diagram illustrating generation of the weighting coefficients for the second-stage training algorithm for the echo cancellation circuit shown in FIG. 9.

Referring now to FIG. 11 and the second stage of EC, two embodiments for computing the K complex weighting coefficients are given as Iterative Algorithm $$C^{l+1}(k) = C^l(k) + L^{-1}[R_l(k) X_l(k)]; \quad (12)$$

$$l = 1, 2, \ldots L; k = k_1, \ldots k_2;$$

and

Smoothed Algorithm $$C(k) = \sum_{n=0}^{k_x-1} R_1(k) X_l^*(k) / \sum_{n=0}^{k_x-1} |X_l(k)|^2; \quad (13)$$

$$k = k_1, \ldots, k_2.$$

Again, both algorithms are effective; however, in order to keep the training packet as short as possible, L, the number of bauds may be minimized. When there are very few bauds, the iterative algorithm will not be as desireable as the smoothed algorithm unless the initial guess in the iterative algorithm is very nearly correct. In one preferred embodiment, equation (10) is used with equation (13) and $N=1$ and $L=1$; while in another preferred embodiment, equation (11) is used with equation (13) and $N=2$ and $L=2$.

The echo canceller of the present invention provides up to 75 db of echo rejection for MFM communications. This makes possible full-duplex signalling over dial-up two-wire telephone circuits at bandwidth efficiencies up to 8 bits per Hz. The EC may be implemented using commercially available 14 bit ADCs and DACs, for example, the Texas Instruments TIC32044. Two stages of LMS type echo cancellation are used to obtain this level of performance; stage one operates in the time domain while stage two operates in the frequency domain. Both stages are driven by the transmit data.

MFDQPSK Modulation

Referring now to FIGS. 12, 13 and 4a–4d, FIGS. 12 and 13 are a flow chart illustrating multi-frequency differential quadrature phase shift keyed (MFDQPSK) modulation and demodulation in which 2 bits of data are encoded into each tone. The resultant MFM signal transmits 2 bits per Hz of the channel bandwidth occupied.

Figure 12:
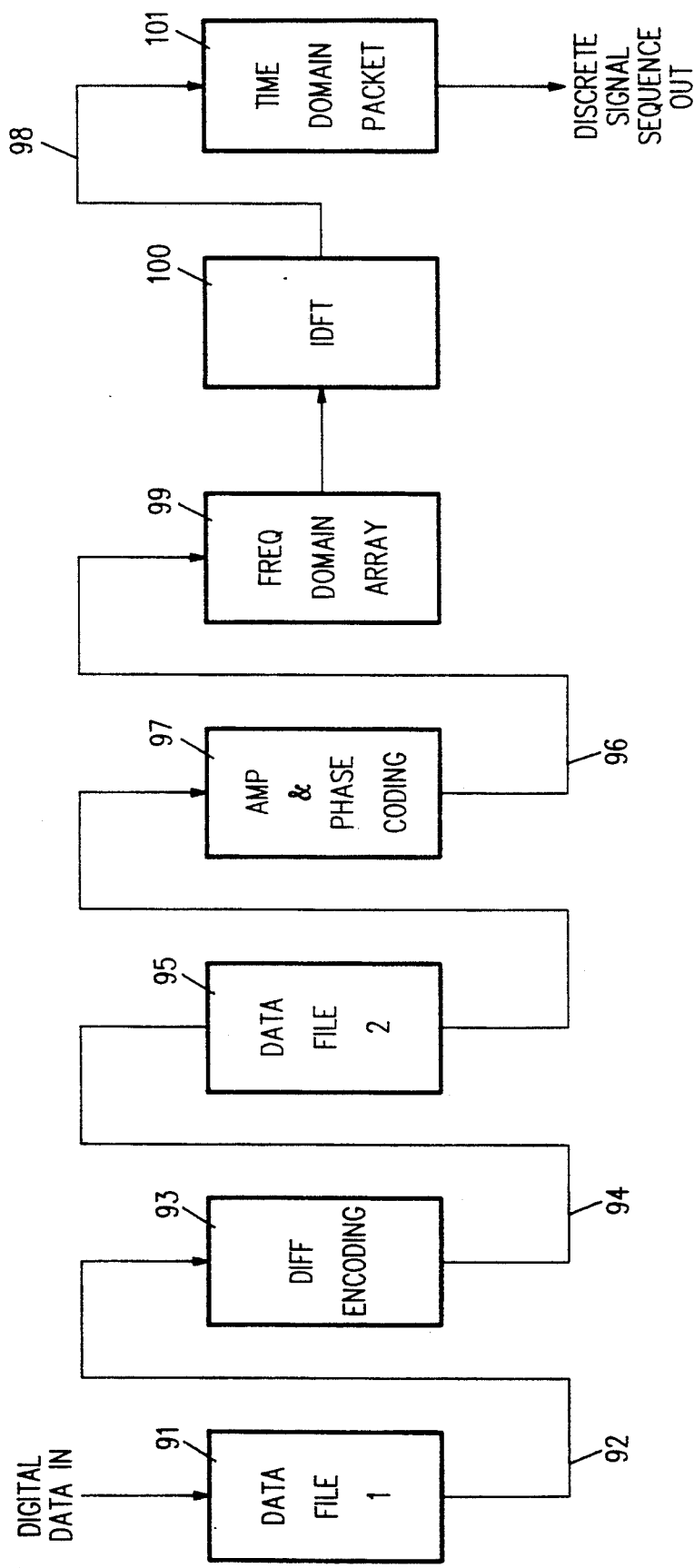
FIG. 12 is a flow diagram illustrating multi-frequency differential quadrature phase shift keyed modulation in accordance with the principles of the present invention.

The encoding and generation of the MFDQPSK signal is illustrated in FIG. 12 in which all blocks 91–101 may be resident in a computer software program executed by the transmit microcomputer 57. Alternatively, some or all of the blocks may be implemented in hardware or firmware, such as in a DSP chip. Input data to be transmitted are placed in a Data File 1 (91) in a 2-bit or di-bit format. The differential encoding step 93 differentially encodes the phase transferring the encoded di-bits to Data File 2 (95). Data File 2 is created with an additional initial state set to $S_o$. The first di-bit from Data File 1 is then encoded into the second state of Data File 2 according to the state transition diagram shown in FIG. 4a. The second di-bit from Data File 1 is encoded into the third state of Data File 2 in accordance with the state transition diagrams of FIGS. 4a–4d where the beginning state is the previous state of Data File 2. This process is continued until all K di-bits from Data File 1 have been differentially encoded into K+1 states of Data File 2. Each of the K+1 digital states provide a modulation value for modulating one of the set of available tones. Examples of Data File 1 and Data File 2 are shown in Table III.

Encoding Step 2 (97) provides amplitude and phase encoding of the K+1 states from Data File 2 into the available tones or carrier frequencies and creates a complex-valued frequency domain array (FDA) file 99 consisting of $k_x$ complex entries. The entries in both Data File 1 and Data File 2 and on lines 92 and 94 comprise n-bit words (n=2 for this embodiment). K+1 of the complex entries in this file somewhere between the first entry, entry 0, and entry $k_x/2 -1$ will be encoded according to the states of Data File 2 as follows: Assume entry number $k_1$ is the first non-zero entry in the FDA File 99. The first state in Data File 2 is always $S_o$ so entry $k_1$ will be loaded with a real part of 1. and an imaginary part of 1. Subsequent entries in the FDA 99 are loaded with complex values according to the subsequent data stored in Data File 2 according to the following rule: If the least significant bit of the state index expressed as a binary number is logical zero, the real part r is set to 1.0; if the least significant bit is logical one, the real part r is set to $-1$. If the most significant bit of the state index expressed as a binary number is logical zero, the imaginary part i of the entry is set to 1.0 and if it is logical one the imaginary part i is set to $-1$. This procedure continues until entry $k_2 = k_1 + K$ is reached and all data in Data File 2 have been encoded into complex valued digital signal values. The remaining entries in the first half of the FDA 99 are set to 0. The second half of the entries in FDA are encoded according to the complex conjugate image rule. This rule is the following: The image of entry k in the first half of the FDA 99 is entry $k_x - k$. The real part of entry $k_x - k$ is set to the same value as the real part of entry k. The imaginary part of entry $k_x - k$ is set to the negative of the imaginary part of entry k. The procedure described above for the Differential Encoding Step 93 and the Amplitude and Phase encoding step 97 is illustrated in Table III for a Data File 1 consisting of 4 di-bits and in Table IV an FDA 99 consisting of 16 complex entries. In this illustration, $k_1$ has been chosen to be entry 2.

TABLE III

| Data File 1 | Data File 2 |
|---|---|
|  | $S_0$ |
| 01 | $S_1$ |
| 10 | $S_0$ |
| 11 | $S_3$ |
| 00 | $S_3$ |

TABLE IV

| k | Frequency Domain Array i | r |
|---|---|---|
| 0 | 0.0 | 0.0 |
| 1 | 0.0 | 0.0 |
| 2 | 1.0 | 1.0 |
| 3 | 1.0 | −1.0 |
| 4 | 1.0 | 1.0 |
| 5 | −1.0 | −1.0 |
| 6 | −1.0 | −1.0 |
| 7 | 0.0 | 0.0 |
| 8 | 0.0 | 0.0 |
| 9 | 0.0 | 0.0 |
| 10 | 1.0 | −1.0 |
| 11 | 1.0 | −1.0 |
| 12 | −1.0 | 1.0 |
| 13 | −1.0 | −1.0 |
| 14 | −1.0 | 1.0 |
| 15 | 0.0 | 0.0 |

The FDA 99 is transformed to the time domain array (TDA) 101 by means of a $k_x$ point Inverse Discrete Fourier Transformation (IDFT) 100. Because of the complex conjugate image symmetry introduced in the FDA 99 the result of the IDFT 100 is real-valued. Thus the TDA 101 consists of $k_x$ real-valued entires. Each real value is stored as an integer-valued byte. These bytes are sent via an I/O port 63 of the transmitting computer 57 to a DAC 65 which is clocked by a clock 64 operating at $f_x$ clock pulses per second. An external clock may be provided. The clock rate $f_x$, may be any value from 0 to an upper limit set by the host computer's 57 ability to transfer bytes from the TDA 101 to the I/O port 63. In a particular embodiment $f_x = 61440$. samples per second, the host computer comprises an IBM PC/AT and the I/O port utilized is the direct memory access (DMA) channel. The DAC 65 converts the byte representation of the digital signal samples to voltage levels thus providing an analog transmit signal which is coupled to the communications channel 55 connecting the data source and destination. The $k_x$ TDA bytes representing the discrete time samples of one baud are clocked out of the DAC 65 in an interval $\Delta T = k_x/f_x$ seconds. Therefore the clock rate of the system, $f_x$, is $k_x$ times the baud rate, $1/\Delta T$.

The analog transmit signal contains K+1 tones spaced at intervals of $1/\Delta T$ beginning at frequency $k_1/\Delta T$ and ending with frequency $k_2/\Delta T$. The maximum value for $k_2$ is $(k_x/2-1)$ which is less than $f_x/2$ as required by the Nyquist Sampling Theorem. The MFDQPSK modulation system operates at a baud rate of $1/\Delta T$ with a bit rate of $2K/\Delta T$. In another embodiment, the system implemented selectively operates at baud rates of 15, 30, 60, 120, and 240 bauds per second with a constant bit rate of 8192 bits per second in a 4000 Hz bandpass channel.

Figure 8:
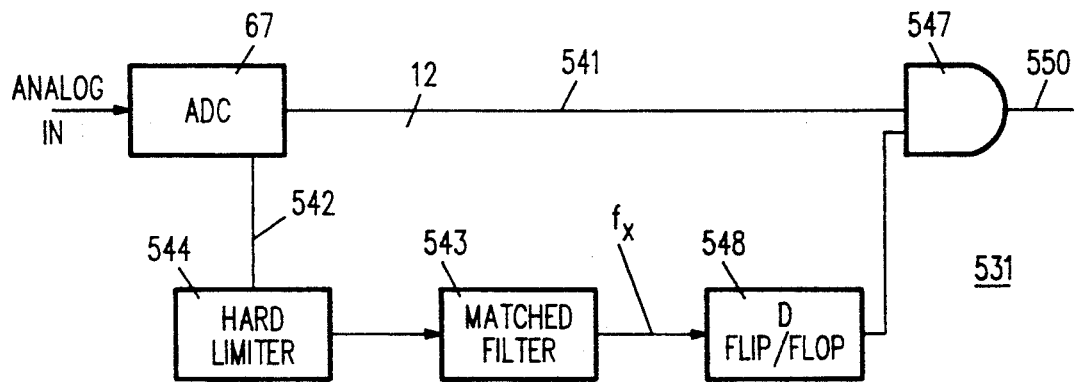
FIG. 8 is a functional block diagram of the data acquisition board shown in FIG. 7.
Figure 13:
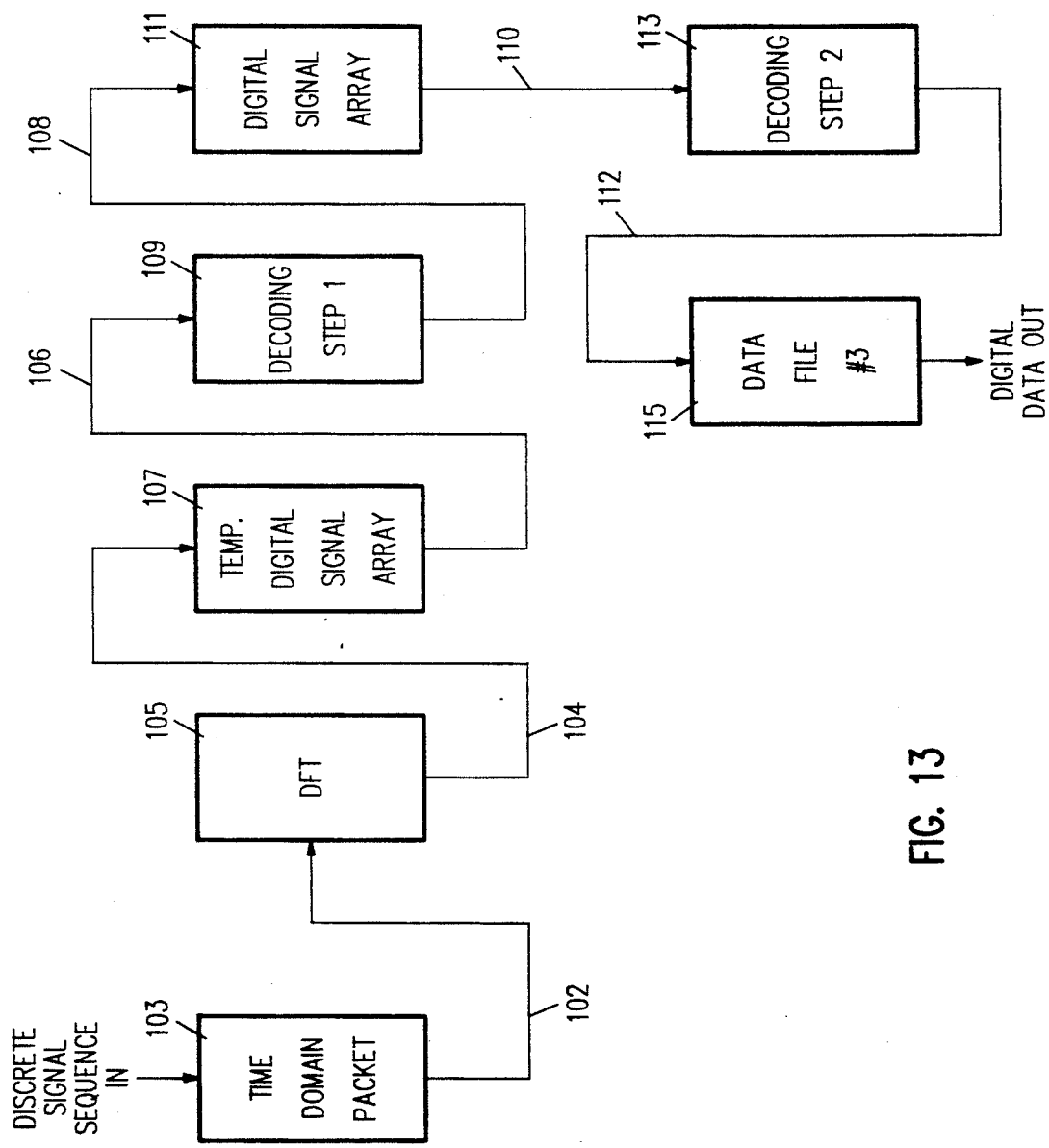
FIG. 13 is a flow diagram illustrating demodulation and decoding for multi-frequency differential quadrature phase shift keyed modulation in accordance with the principles of the present invention.

The signal flow diagram for receiving and decoding the MFDQPSK signal is shown in FIG. 13. The received analog signal is synchronized and digitized by data acquisition board 531 (as shown in FIGS. 7 and 8) which couples digitized, real-valued data to the receive time domain array or packet (TDA) 103. Process blocks 103-115 are internal to the receiving computer and are implemented as a computer software program. Alternatively, some or all of process blocks may be implemented in hardware or firmware. Receive ADC 67 must be clocked at the same rate, $f_x$, as the DAC 65 in transmit section 51 with an accuracy of plus or minus $f_x/(16\ k_2)$ Hz. Baud synchronization timing accuracy must be established to within plus or minus four clock cycles. In the preferred embodiment this is established without direct timing information from the transmit section 51 by preceding each packet of information bauds with a known synchronization baud and correlating it with a stored reference in matched filter 69 as described hereinabove.

The data acquisition board 531 provides digitized received signal samples to a receive computer I/O port 71. The host receive computer 59 stores these samples in the receive TDA 103 having $k_x$ times L entries in a real-valued array. The DFT 105 and Decoding Step 1 109 transform $k_x$ entries at a time, that is one baud at a time, from the receive TDA 103 to the complex valued receive digital signal array (DSA) 111 according to the following procedures: The $k_x$ point DFT of the first $k_x$ real valued points in the TDA 103 is obtained and only those (complex valued) coefficients between entry $k_1$ and $k_2$ are retained and placed in a temporary digital signal array 107. All other components of the transformation are discarded. The entry corresponding to $k_1+1$ is multiplied by the complex conjugate of the entry corresponding to $k_1$ to create a complex number with a phase equal to the phase difference between tones $k_1+1$ and $k_1$. This complex number then is multiplied by the complex number $\exp(j\pi/4)$, to add $\pi/4$ radians to the phase difference, and the result is stored as the first entry in the receive DSA 111. The same operation is performed on entries $k_1+2$ and $k_1+1$ and so forth until the final operation is performed on entries $k_2$ and $k_2-1$ resulting in K complex entries in the receive DSA 111. The K complex entries are decoded in Decoding Step 2 (113) to create Data File 3 (115) as follows: if the real part of the complex entry is positive, the least significant bit of the di-bit corresponding to that entry in the DSA 111 is made logical zero; if the least significant bit is negative, it is made logical one. The most significant bit of the di-bit is decoded from the imaginary part of the corresponding complex entry in the same manner. The final result is that the first K di-bits of Data File 1 (91) at the source (i.e., input data at the transmit section 51) have been transferred to Data File 3 (115) at the destination (i.e., receive section 53). This procedure is repeated on the remaining entries in the real valued data stored in the receive TDA 103, $k_x$ values at a time, until all L bauds in the packet have been decoded. In the preferred embodiment, with $k_x$ of 1024, a baud rate of 60 bauds per second, K of 64 and L of 30 bauds, 3840 bits of information are transmitted in a packet having an interval of ½ second in a 3960 Hz bandwidth. The band may be placed anywhere in the frequency spectrum from 60 Hz to 30,660 Hz simply by choosing different values for $k_1$.

MFD16QAM Modulation

Figure 14A:
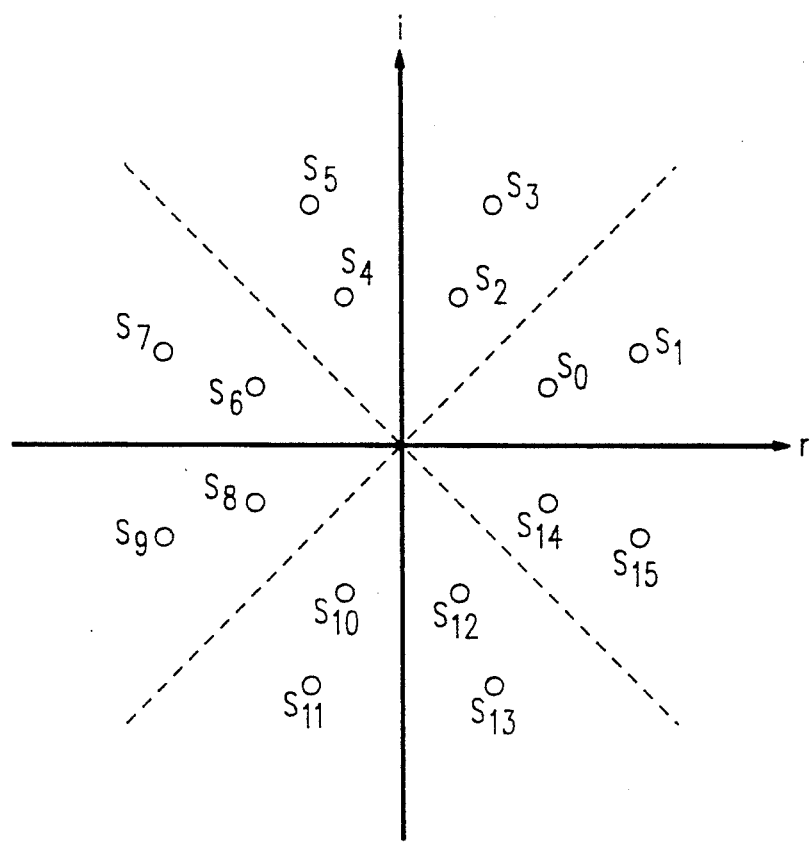
FIG. 14a is a diagram illustrating the transition states for multi-frequency differential 16-quadrature amplitude modulation according to the principles of the present invention.
Figure 14B:
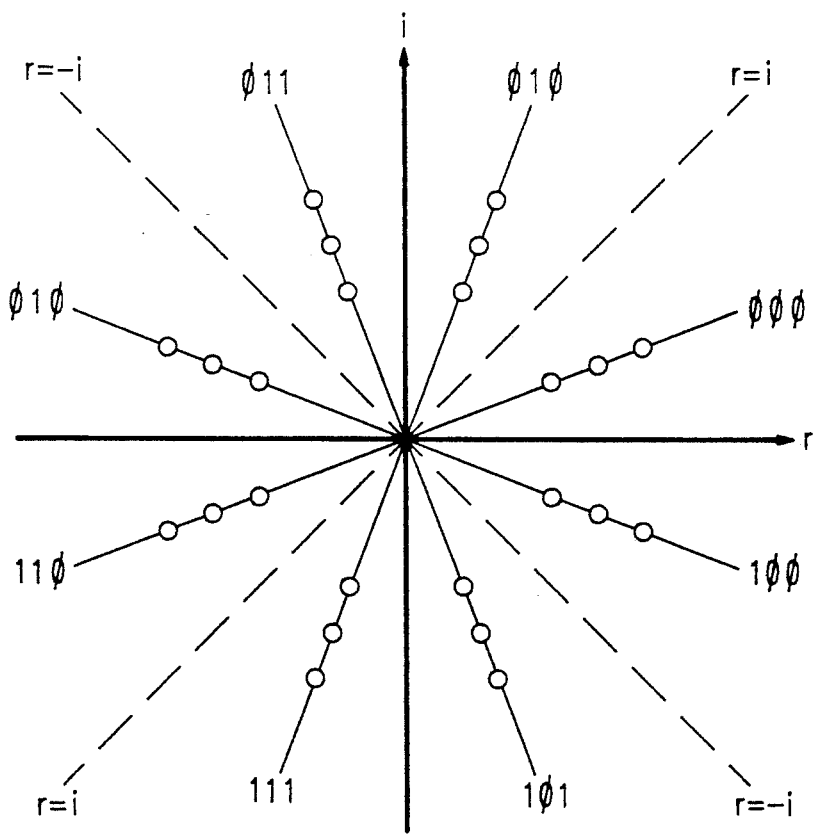
Figure 15:
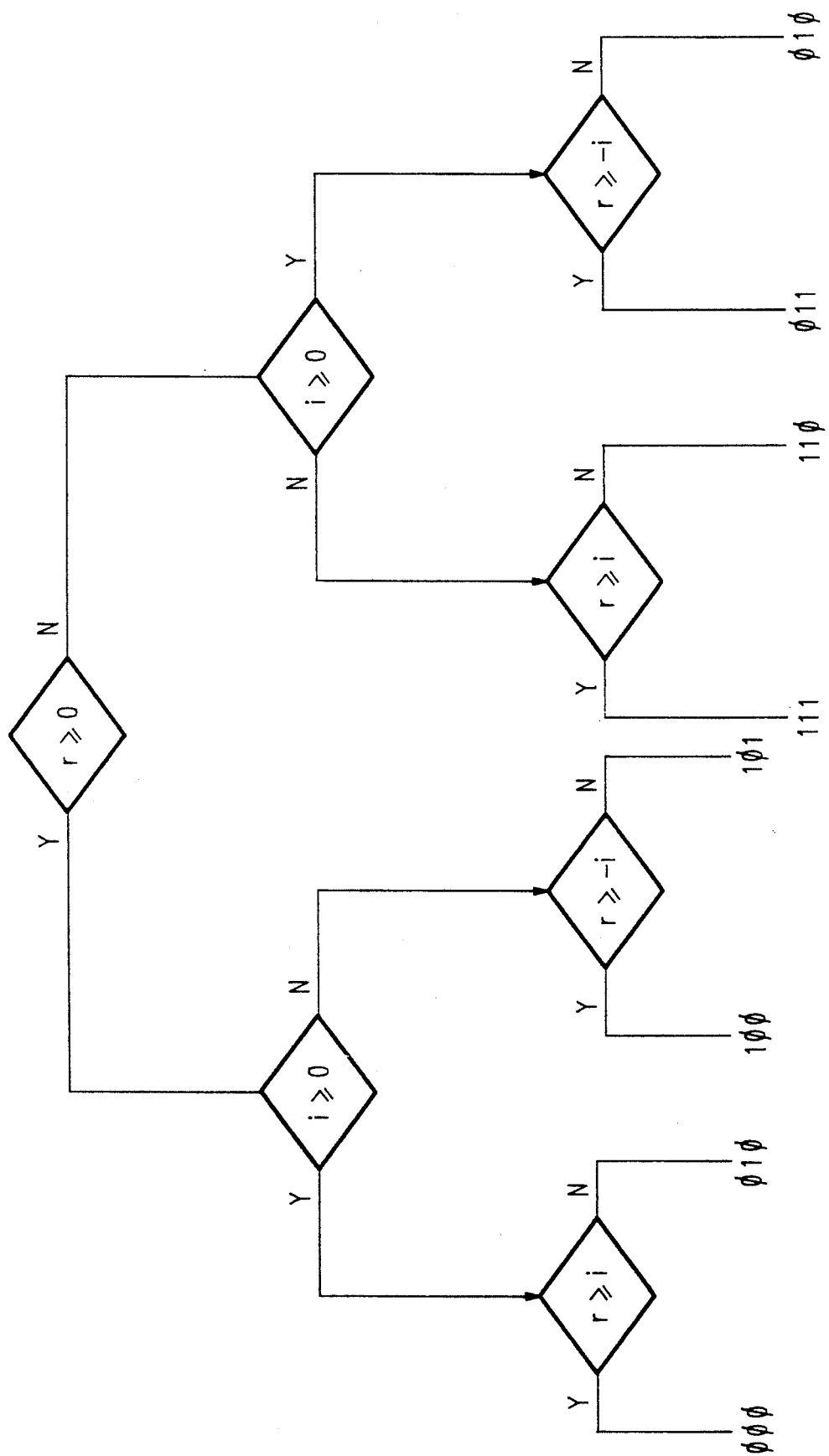
FIG. 15 is a diagram illustrating a decoding decision tree for decoding differentially encoded data in accordance with the encoding strategy shown in FIGS. 14a and 14b.

Referring now also to FIGS. 14a, 14b and 15, in the preferred embodiment, multi-frequency differential 16-quadrature amplitude modulation (MFD16-QAM) differs from the MFDQPSK modulation described above in the following ways. The digital input data is stored in Data File 1 (91) in 4-bit words referred to as "nibbles", and are encoded into each tone using the 16 point state diagram or constellation shown in FIG. 14a. Thus, in MFD16-QAM, data is transmitted at 4 bits per Hz of allocated channel bandwidth.

The state diagram for the differential encoding from frequency to frequency is given in Table V for each of the 16 values for an input nibble. The diagram defines the state for tone $k+1$ for the conditions that tone k is in an even numbered state, and that tone k is in an odd numbered state. Index n takes on all values from 0 through 7 and the indicated index n addition is performed modulo 16.

TABLE V

| Input Nibble | State for tone $k + 1$ Given that tone k is in state: | |
|---|---|---|
| | $S_{2n}$ (Even) | $S_{2n+1}$ (Odd) |
| 0000 | $S_{2n+1}$ | $S_{2n}$ |
| 0001 | $S_{2n}$ | $S_{2n+1}$ |
| 0010 | $S_{2n+3}$ | $S_{2n+2}$ |
| 0011 | $S_{2n+2}$ | $S_{2n+3}$ |
| 0110 | $S_{2n+5}$ | $S_{2n+4}$ |
| 0111 | $S_{2n+4}$ | $S_{2n+5}$ |
| 0100 | $S_{2n+7}$ | $S_{2n+6}$ |
| 0101 | $S_{2n+6}$ | $S_{2n+7}$ |
| 1100 | $S_{2n+9}$ | $S_{2n+8}$ |
| 1101 | $S_{2n+8}$ | $S_{2n+9}$ |
| 1110 | $S_{2n+11}$ | $S_{2n+10}$ |
| 1111 | $S_{2n+10}$ | $S_{2n+11}$ |
| 1010 | $S_{2n+13}$ | $S_{2n+12}$ |
| 1011 | $S_{2n+12}$ | $S_{2n+13}$ |
| 1000 | $S_{2n+15}$ | $S_{2n+14}$ |
| 1001 | $S_{2n+14}$ | $S_{2n+15}$ |

The first 3 bits i.e., the 3 most significant bits, of each input nibble represent phase and are differentially encoded as a Gray code so that differentially decoded phase symbols that are adjacent in phase only differ by 1 bit as shown in Table V. The fourth bit i.e., the least significant bit, of each input nibble is an amplitude bit and is encoded such that the magnitude of tone $k+1$ is changed to the alternate amplitude if the amplitude bit is a logical zero but remains unchanged if it is a logical one. Table VI is an example of a 4-nibble message stored in Data File 1 and the differentially encoded data in Data File 2 (95). Table VII illustrates the corresponding FDA file 99 after the amplitude and phase encoding process 97.

TABLE VI

| Data File 1 | Data File 2 |
|---|---|
| | $S_0$ |
| 0111 | $S_4$ |
| 1100 | $S_{13}$ |
| 1010 | $S_8$ |
| 1001 | $S_6$ |

TABLE VII
FREQUENCY DOMAIN ARRAY

| K | i | r |
|---|---|---|
| 0 | 0.0 | 0.0 |
| 1 | 0.0 | 0.0 |
| 2 | .2296 | .5543 |
| 3 | .5543 | −.2296 |
| 4 | −.9239 | .3827 |
| 5 | −.2296 | −.5543 |
| 6 | .2296 | −.5543 |
| 7 | 0.0 | 0.0 |
| 8 | 0.0 | 0.0 |
| 9 | 0.0 | 0.0 |
| 10 | −.2296 | −.5543 |
| 11 | .2296 | −.5543 |
| 12 | .9239 | .3827 |
| 13 | −.5543 | −.2296 |
| 14 | −.2296 | .5543 |
| 15 | 0.0 | 0.0 |

Demodulation of the MFD16-QAM receive TDP proceeds similarly as demodulation of the MFDQPSK to the point of creation of the temporary digital signal array 107. A 12-bit ADC is utilized in the data acquisition board 531 to reduce quantization noise. To decode the 3-bit phase symbols, each complex entry in the temporary digital signal array 107 is multiplied by the complex conjugate of the previous complex entry and the product is multiplied by the complex number $\exp(j\pi/8)$. In the absence of noise or other errors, the resulting complex products will be the 24 possible points in the phase diagram or constellation shown in FIG. 14$b$. The largest amplitude points occur when adjacent tones both have the large amplitude. The smallest amplitudes occur when adjacent tones both have the smaller amplitude. The intermediate amplitudes occur when the adjacent tones have different amplitudes, i.e., the amplitude bit is a logical zero.

The eight possible phase symbols are decoded in accordance with the decision tree shown FIG. 15. The phase decoding rules shown are amplitude independent and are the optimum decision rules for decoding the phase in the presence of additive noise.

The amplitude bit is decoded by comparing the magnitudes of the complex values in adjacent positions of the temporary digital signal array 107. In the preferred embodiment, the large and small magnitude tones are created in a ratio of 5 to 3. If the received magnitudes of adjacent tones differ by more than $\frac{1}{8}$ the magnitude of the sum, the amplitude bit is decoded as a logical zero, otherwise it is decoded as a logical one.

Upon completion of the decision process in FIG. 15, K nibbles or K 4-bit words have been transferred from Data File 1 (91) at the transmit computer 57 to Data File 3 (115) of the receive computer 59. This demodulation and decoding process is repeated for each of the L bauds in the receive TDA 103 until 4KL bits (KL/2 bytes) have been transferred from Data File 1 at the transmitter 51 to Data File 3 of the receiver 53. In the preferred embodiment with $k_x$ of 2048, K of 128, L of 15 and baud rate of 30 bauds per second, 960 bytes are transferred in $\frac{1}{2}$ second in a 3960 Hz bandwidth at 15,360 bits/sec.

Figure 16:
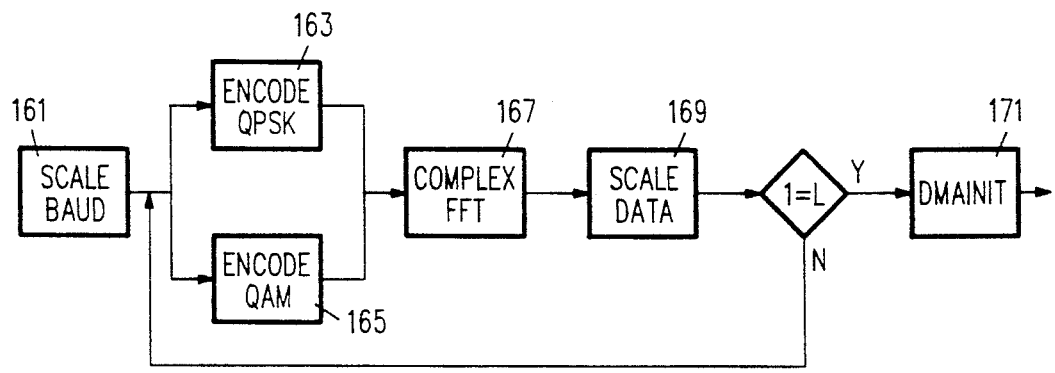
FIG. 16 is a flow chart illustrating a transmit algorithm for use in the transmit microcomputer shown in FIG. 5.

Referring to FIG. 16, a procedural flow diagram of a computer software program named TRANSMIT as implemented in the preferred embodiment is shown. The TRANSMIT program generates the MFM data signal and provides encoding of data files utilizing 16-QAM, QPSK and DQPSK methods. The program provides for packet size, and generates a synchronization baud.

EncodeQPSK 163 begins by displaying a four symbol QPSK constellation which is used as a reference in selecting the symbols over the band. The symbols for the K tones in the baud can be selected in a variety of ways: symbols for all tones may be randomly selected from a random generator; a symbol for each tone may be selected by the user; and individual tones may be removed from the band. The capability to remove tones from the band allows construction of a baud with an arbitrary number of tones within the band determined by $k_1$ and $k_2$. Selected symbols for the band are loaded into the complex frequency domain array with their complex conjugate image frequency. EncodeQAM 165 is functionally identical to EncodeQPSK 163, except the symbols conform to a 16-QAM constellation (as shown in FIG. 14$a$).

To obtain the real discrete time-domain array of the encoded baud, ComplexFFT 167 computes the inverse FFT. ComplexFFT 167 consumes the majority of the processing time in the program due to the complex arithmetic operations required, thus restricting the overall throughput of the system. For real time processing, the FFT algorithm is computed by a floating point array processor.

Each value in the time domain array is represented as a real data type, occupying six bytes of memory. Scale Data 169 converts these values down to a one byte format acceptable to the DAC and places them into a packet storage buffer. EncodeQPSK 163, ComplexFFT 167, and ScaleData 169 are executed for each baud, until all L baud have been processed. To transmit the packet out of the computer, DMAINIT 171 transfers samples at the clock frequency, $f_x$ samples per second over the DMA channel to the DAC. The source code listing for the TRANSMIT program is given in Appendix A attached hereto.

Figure 17:
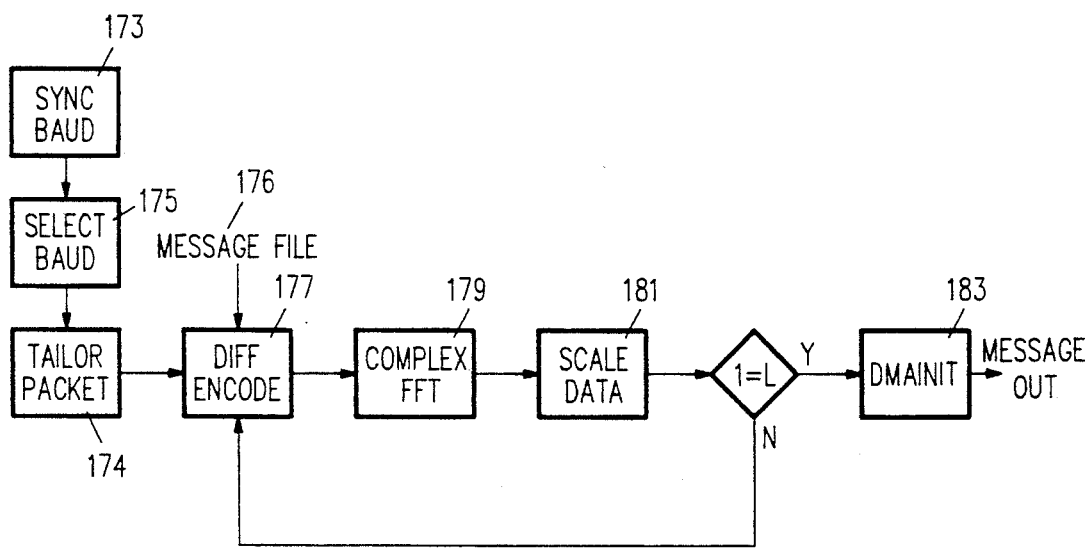
FIG. 17 is a flow chart illustrating another transmit algorithm for use in the transmit microcomputer shown in FIG. 5.

Referring now to FIG. 17, a procedural flow diagram of another transmit computer software program named XMITMES as implemented in another preferred embodiment is shown. The XMITMES program generates an MFM data signal which encodes and transmits an ASCII file using DQPSK. A synchronization baud is attached at the beginning of each packet. The XMITMES program has a less complex structure than the TRANSMIT program described above because all tones are placed in a fixed band and are encoded utilizing DQPSK.

The synchronization baud for XMITMES is a predetermined sequence generated by SyncBaud 173. This baud is constructed as are all other baud, except $k_x$ is fixed at 256, and tones 68 to 83, which are the tones in the fixed band, are encoded with the same random symbol pattern regardless of the packet construction or input message 176. This synchronization sequence occupies the first 256 values in the packet buffer and therefore is the first to be clocked out of the transmit computer 57.

Since the input message 176 can be of arbitrary size, TailorPacket 174 determines the maximum number of baud required for encoding. This is determined by dividing the number of characters in the message by the number of characters that can be encoded.

DiffEncode 177 encodes the message file 176 into the complex frequency domain-array. It reads one character at a time; then breaks the 8-bit character into four 2-bit words. The words are DQPSK encoded and stored in the frequency domain array. Once encoded, processing and signal output by ComplexFFT 179, ScaleData 181, and DMAINIT 183 proceed similarly as in TRANSMIT program. The source code listing for the XMITMES program is given in Appendix B attached hereto.

Figure 18:
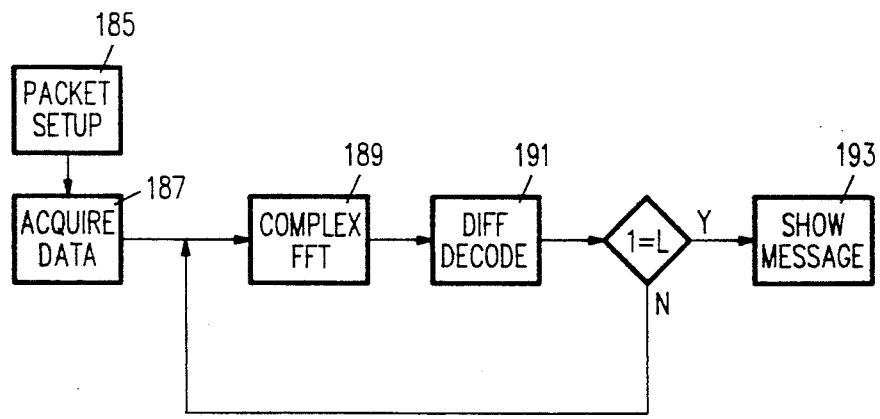
FIG. 18 is a flow chart illustrating a receive algorithm used in the receive microcomputer shown in FIG. 5.

Referring now to FIG. 18, a procedural flow diagram of a computer software program named RECEIVE as implemented in the preferred embodiment is shown. The RECEIVE program demodulates the encoded MFM transmit signal generated by the TRANSMIT program. A user interactive procedure, PacketSetUp 185 tailors the processing to the expected receive packet, using the inputs $k_x$ and L. AcquireData 187 allocates memory to store the sampled values transferred from the board using the receive computer DMA controller. Direct Memory Access is the only data transfer mode capable of transferring data to memory at the required rate without disruption by other interrupt processes in the computer. Other important initialization parameters are triggering source and the number of samples to be collected. The ADC may be triggered from two sources, a programmable interval timer or an external trigger source (not shown). The programmable interval timer divides either a 1 MHz or 10 MHz clock to derive the sampling rate of the trigger. After initialization, conversions take place on the positive transition of every trigger until the specified number of samples have been acquired and transferred to memory. Diff-Decode 191 demodulates the encoded symbols by differentially decoding the complex frequency array transformed from the sampled data by ComplexFFT 189. AcquireData 187 samples and stores a memory segment of data regardless of the packet size, $Lk_x$. However, once stored, ConvertData, ComplexFFT 189, and Diff-Decode 191 process only L baud of the data. Diff-Decode 191 combines four differentially decoded symbols into one byte, representing the ordinal number of an ASCII character. To reconstruct the message, the characters are transferred to text file MESSAGE.DAT until processing is complete. When desired, ShowMessage 193 displays the recovered message. The source code listing for the RECEIVE program is given in Appendix C attached hereto.

While the present invention has been particularly shown and described with respect to certain preferred embodiments thereof, it should be readily apparent to those of ordinary skill in the art that various changes and modifications in form and details may be made without departing from the spirit and scope of the invention as set forth in the appended claims.

APPENDIX A TRANSMIT

```
program TRANSMIT;
(*Transmits variable length packets up to 61440. The length is
 determined by BCSTARRAY and can be take to a full segment of memory.
 No sync baud is used. All external files are assumed to be in the same
 directory*)

type
    TNvector    = array[0..4095] of real;
    TNvectorPtr = ^TNvector;
    BCSTARRAY   = array[-28673..32767] of byte;   (*stores output samples*)

var
    kx,             (*baud size*)
    k1,             (*lowest tone in band*)
    k2,             (*highest tone in band*)
    NUMBAUDS,       (*number of bauds in packet*)
    BAUDCOUNT,      (*current baud being processed*)
    BYTECOUNT,      (*number of bytes to be transferred by DMA*)
    I       : integer;
    XREAL,          (*complex freq/time domain arrays*)
    XIMAG   : TNvectorPtr;
    QAM,            (*encoding scheme*)
    INVERSE : boolean;     (*direction of FFT*)
    ERROR   : byte;        (*status of ComplexFFT*)
    BCST    : BCSTARRAY;   (*packet storage buffer*)
    TIEFILE : file of byte;(*time sequence output file*)
    ANSWER  : char;        (*input variable*)

(*$I FFT87B2.INC*)
(*$I COMPFFT.INC*)

(*----------------------------------------------------------------------*)
procedure SelectBaud;
(*SelectBaud establishes QPSK or QAM encoding kx, k1, k2, and the number
 of baud in the packet*)
```

```
var
   ANSWER     : integer;
   MODANSWER  : char;

begin
   window(20,10,80,20);

(*Select encoding scheme*)
   repeat
      clrscr;
      writeln('Select modulation desired');
      writeln;
      writeln('    A --- QPSK');
      writeln('    B --- 16 QAM');
      readln(MODANSWER);
   until MODANSWER in ['a','A','b','B'];
   if MODANSWER in ['b','B'] then
      QAM := true;

(*Select buad size*)
   kx:=0;
   repeat
      clrscr;
      if kx < 0 then writeln('TRY AGAIN');
      writeln('What is the length of the bauds (kx)?');
      writeln('i.e. 256, 512, 1024, 2048, 4096');
      readln(ANSWER);
      case ANSWER of
         256:  kx:=256;
         512:  kx:=512;
         1024: kx:=1024;
         2048: kx:=2048;
         4096: kx:=4096;
      end; (*case ANSWER*)
      if kx = 0 then kx := -1;
   until kx > 0;

(*Set bandlimits*)
   case kx of
      256: begin
             k1:=68;  k2:=83;
           end;
      512: begin
             k1:=135; k2:=166;
           end;
      1024: begin
             k1:=269; k2:=332;
           end;
      2048: begin
             k1:=537; k2:=664;
           end;
      4096: begin
             k1:=1073; k2:=1328;
           end;
   end; (*case kx*)

(*Select number of baud*)
   write('How many bauds do your desire to transmit?  ');
   readln(NUMBAUDS);
   window(1,1,80,25);
end; (*SelectBaud*)
```

```
(*------------------------------------------------------------------*)
(*------------------------------------------------------------------*)
procedure DisplayQAM;
(*DisplayQAM shows the 16-QAM constellation in the upper portion of the
  screen. A window is set at the bottom of the screen for further
  interaction with the user.*)

begin
   clrscr;
   gotoXY(11,1);
   write(chr(218));
   for I:= 12 to 64 do
      write(chr(196));
   write(chr(191));
   for I:= 2 to 19 do
      begin
         GotoXY(11,I); write(chr(179));
         GotoXY(65,I); write(chr(179));
      end;
   GotoXY(11,20);
   write(chr(192));
   for I := 12 to 64 do
      write(chr(196));
   write(chr(217));

window(12,2,63,19);
   write('This program encodes a 16 QAM multifrequency');
   writeln(' signal.');
   writeln('The vector space is shown for one frequency.');
   writeln('               ',chr(179),'                    ');
   writeln('    *     *    ',chr(179),'    *     *         ');
   writeln('    4     3    ',chr(179),'    2     1         ');
   writeln('               ',chr(179),'                    ');
   writeln('    *     *    ',chr(179),'    *     *         ');
   writeln('    8     7    ',chr(179),'    6     5         ');
   writeln('_____',chr(179),'_____');
   writeln('               ',chr(179),'                    ');
   writeln('    *     *    ',chr(179),'    *     *         ');
   writeln('    12    11   ',chr(179),'    10    9         ');
   writeln('               ',chr(179),'                    ');
   writeln('    *     *    ',chr(179),'    *     *         ');
   writeln('    16    15   ',chr(179),'    14    13        ');
   writeln('               ',chr(179),'                    ');

(*active window*)
   window(12,21,80,25);
end;(*DisplayQAM*)
(*------------------------------------------------------------------*)
(*------------------------------------------------------------------*)
procedure DisplayQPSK;
(*DisplayQPSK shows the QPSK constellation in the upper portion of the
  screen. A window is set at the bottom of the screen for further
  interaction with the user.*)

begin
   clrscr;
   gotoXY(11,1);
   write(chr(218));
   for I:= 12 to 64 do
      write(chr(196));
   write(chr(191));
```

```
      for I:= 2 to 19 do
         begin
             GotoXY(11,I); write(chr(179));
             GotoXY(65,I); write(chr(179));
         end;
   GotoXY(11,20);
   write(chr(192));
   for I := 12 to 64 do
      write(chr(196));
   write(chr(217));

window(12,2,63,19);
   writeln('This program encodes a QPSK multifrequency signal.');
   writeln('The phase are shown for one frequency.');
   writeln('                         ',chr(179),'                        ');
   writeln('            *            ',chr(179),'            *           ');
   writeln('            2            ',chr(179),'            1           ');
   writeln('                         ',chr(179),'                        ');
   writeln('                         ',chr(179),'                        ');
   writeln('                         ',chr(179),'                        ');
   writeln('_____ ',chr(179),'_____');
   writeln('                         ',chr(179),'                        ');
   writeln('                         ',chr(179),'                        ');
   writeln('                         ',chr(179),'                        ');
   writeln('            *            ',chr(179),'            *           ');
   writeln('            3            ',chr(179),'            4           ');
   writeln('                         ',chr(179),'                        ');

(*active window*)
   window(12,21,80,25);
end;(*DisplayQPSK*)
(*------------------------------------------------------------------*)
(*------------------------------------------------------------------*)
procedure SelectQAM;
(*SelectQAM selects and encodes the symbols for each tone in the band set
  by k1 and k2. All symbols can be randomly or manually selected.*)

var
        RESPONSE    : char;
        ANSWER,I    : integer;
        VECTORARRAY.: array[0..4095] of integer;

(*------------------------------------------------------------------*)
procedure EncodeData;
(*EncodeData loads the frequency domain arrays XREAL and XIMAG with the
 QAM symbols in VECTORARRAY and their complex conjugate image.*)

var
   J             : integer;
   TEMPR,TEMPI   : real;

begin
   fillchar(XREAL^,sizeof(XREAL^),0);
   fillchar(XIMAG^,sizeof(XIMAG^),0);
   for J:= k1 to k2 do
       begin
          case VECTORARRAY[J] of
              0      :TEMPI:= 0.0;
              1..4   :TEMPI:= 90.0;
              5..8   :TEMPI:= 30.0;
```

```
                9..12 : TEMPI:=-30.0;
               13..16: TEMPI:=-90.0;
            end;(*case VECTORARRAY*)
            case VECTORARRAY[J] of
               0             : TEMPR:= 0.0;
               1,5,9,13   : TEMPR:= 90.0;
               2,6,10,14: TEMPR:= 30.0;
               3,7,11,15: TEMPR:=-30.0;
               4,8,12,16: TEMPR:=-90.0;
            end;(*case VECTORARRAY*)

(*Load complex conjugate image*)
            XREAL^[J]:= TEMPR;
            XREAL^[kx-J]:= TEMPR;
            XIMAG^[J]:= TEMPI;
            XIMAG^[kx-J]:= -TEMPI;
         end;(*J:=k1*)
end;(*EncodeData*)
(*---------------------------------------------------------------*)
begin
   repeat
      clrscr;
      writeln('   Select one of the following for baud ',BAUDCOUNT,'.');
      writeln;
      writeln('R         Randomly select all ',k2 - k1 + 1,' vectors');
      writeln('I         Individually select vectors');
      readln(RESPONSE);
   until RESPONSE in ['r','R','i','I'];
   fillchar(VECTORARRAY,sizeof(VECTORARRAY),0);
   case RESPONSE of
      'r','R' : for I:= k1 to k2 do
                    VECTORARRAY[I]:=random(16)+1;
      'i','I' : begin
                   I:= k1;
                   while I <= k2 do
                      begin
                         repeat
                            clrscr;
                            writeln('      Vector Selection Menu');
                            writeln('#       vector desired');
                            writeln('17      random vector');
                            writeln('18      no vector');
                            write('19      no more tones     Tone ',I,' ');
                            readln (ANSWER);
                         until ANSWER in [1..19];
                         case ANSWER of
                            1..16: VECTORARRAY[I]:= ANSWER;
                               17: VECTORARRAY[I]:= random(16)+1;
                               18:;(*nop*)
                               19: I:= k2;
                         end;(*case ANSWER*)
                         I:=I+1;
                      end;(*while I*)
                end;(*'i','I'*)
   end;(*case RESPONSE*)
   EncodeData;
end;(*SelectQAM*)
(*---------------------------------------------------------------*)
(*---------------------------------------------------------------*)
procedure SelectQPSK;
```

(*SelectQPSK selects and encodes the symbols for each tone in the band set by k1 and k2. All symbols can be randomly or manually selected.*)

```
var
   RESPONSE   : char;
   ANSWER,I   : integer;
   PHASEARRAY : array[0..4095] of integer;

(*----------------------------------------------------------------*)
procedure EncodeData;
(*EncodeData loads the frequency domain arrays XREAL and XIMAG with the
 QPSK symbols in VECTORARRAY and their complex conjugate image.*)

var
    J          : integer;
    TEMPR,TEMPI : real;

begin
    fillchar(XREAL^,sizeof(XREAL^),0);
    fillchar(XIMAG^,sizeof(XIMAG^),0);
    for J:= k1 to k2 do
        begin
           case PHASEARRAY[J] of
               0     : TEMPI:= 0.0;
               1,2   : TEMPI:= 80.0;
               3,4   : TEMPI:=-80.0;
           end;(*case PHASEARRAY*)
           case PHASEARRAY[J] of
               0   : TEMPR:= 0.0;
               1,4 : TEMPR:= 80.0;
               2,3 : TEMPR:=-80.0;
           end;(*case PHASEARRAY*)
           XREAL^[J]:= TEMPR;
           XREAL^[kx-J]:= TEMPR;
           XIMAG^[J]:= TEMPI;
           XIMAG^[kx-J]:= -TEMPI;
        end;(*J:=k1*)
end;(*EncodeData*)
(*----------------------------------------------------------------*)
begin
   repeat
      clrscr;
      writeln(' Select one of the following for baud ',BAUDCOUNT,'.');
      writeln;
      writeln('R      Randomly select all ',k2 - k1 + 1,' phases');
      writeln('I      Individually select phases');
      readln(RESPONSE);
   until RESPONSE in ['r','R','i','I'];
   fillchar(PHASEARRAY,sizeof(PHASEARRAY),0);
   case RESPONSE of
      'r','R':for I:= k1 to k2 do
                 PHASEARRAY[I]:=random(4)+1;
      'i','I':begin
                 I:= k1;
                 while I <= k2 do
                    begin
                       repeat
                          clrscr;
                          writeln('       Phase Selection Menu');
                          writeln('#      phase desired');
                          writeln('S      random phase');
```

```
                    writeln('6      no phase');
                    write('7      no more tones    Tone ',i,' ');
                    readln (ANSWER);
                  until ANSWER in [1..7];
                  case ANSWER of
                     1..4: PHASEARRAY[I]:= ANSWER;
                        5: PHASEARRAY[I]:= random(4)+1;
                        6: ;(*nop*)
                        7: I:= k2;
                  end;(*case ANSWER*)
                  I:=I+1;
                end;(*while I*)
            end;(*'i','I'*)
    end;(*case RESPONSE*)
    EncodeData;
end;(*SelectQPSK*)
(*----------------------------------------------------------------*)
procedure ScaleData;
(*ScaleData converts each real value in array XREAL down to a byte and
 stores the byte in packet storage buffer BCST. INDEX sets the location
 in the buffer of each byte*)

var
    INDEX,J,TEMP    : integer;
    DATA            : byte;

begin
    for J := 0 to kx-1 do
        begin
            TEMP := round(XREAL^[J] + 126);
            if TEMP < 0 then
                TEMP := 0;
            DATA := TEMP;
            INDEX := J + (BAUDCOUNT - 1) * kx - 28673;
            BCST[INDEX] := DATA;
            write(THEFILE,DATA);
        end;(*for J*)
end; (*ScaleData*)
(*----------------------------------------------------------------*)
(*----------------------------------------------------------------*)
procedure Dmainit(var BCST : BCSTARRAY;
                      BYTECOUNT : integer);
(*Assembly language procedure used to initialize and unmask the DMA for
 data transfer. The source must be converted to a BIN file.*)
external 'DMAINIT5.BIN';
(*----------------------------------------------------------------*)
procedure Dmastop; (*Masks DMA, stopping data transfer*)
external 'DMASTOP.BIN';
(*----------------------------------------------------------------*)
procedure TINPUT;
(*This procedure reads in binary file, HOUTFA1.DAT, into an array,
 performs an FFT using ComplexFFT and displays the results
 with GraphData*)

var
    NUMPTS : integer;
(*----------------------------------------------------------------*)
procedure GetData;
(*GetData reads time domain sequence from file HOUTFA1.DAT into XREAL*)
```

```
var
   THEFILE : file of byte;
   DATA    : byte;
   I,
   TEMP    : integer;
   rdata   : real;

begin
   assign(THEFILE,'HOUTFA1.DAT');
   reset(THEFILE);
   new(XREAL);
   new(XIMAG);
   fillchar(XREAL^,sizeof (XREAL^),0);
   fillchar(XIMAG^,sizeof (XIMAG^),0);
   for I := 0 to kx-1 do
     begin
        read(THEFILE,DATA);(*read file one byte at a time*)
        TEMP := DATA;
        temp := temp and 255;   (*reduces number of bits used*)
                                (*to represent the input data*)

XREAL^[I] := (TEMP - 126); (*loads XREAL array*)
     end; (*for I*)
   close(THEFILE);
end; (*GetData*)
(*----------------------------------------------------------------*)
(*----------------------------------------------------------------*)
procedure PutData;
(*Writes frequency domain arrays XREAL and XIMAG to file TFFTOUT.OUT*)

var
   I       : integer;
   OUTFILE : text;

begin
   assign(OUTFILE,'TFFTOUT.DAT');
   rewrite(OUTFILE);
   for I := 0 to kx-1 do
      writeln(OUTFILE,I,' ',XREAL^[I],' ',XIMAG^[I]);
   close(OUTFILE);
end; (*PutData*)
(*----------------------------------------------------------------*)
procedure GraphData;
(*GraphData plots the kx/2 points of complex array XREAL and XIMAG.
  Symbols are decoded and represented by the color of each tones
  spectral line.*)

var
   I,J,              (*loop indices*)
   KXDIV2,
   COLOR,
   X,XZ,
   Y,YZ   : integer;

begin
   GraphColorMode;
   palette(2);
   Graphbackground(0);
   draw(30,10,30,170,1);       (*y-axis*)
   draw(30,170,300,170,1);     (*x-axis for full spectrum*)
   draw(30,155,300,155,1);
```

```
   draw(30,80,300,80,1);        (*x-axis for zoom spectrum*)

(*every other dot equals one bin at  256*)
   draw(166,170,166,174,1);  (*x-axis scale marks*)
   draw(196,170,196,174,1);  (*x-axis scale marks*)
   draw(30,113,26,113,1);    (*y-axis scale marks*)
   draw(30,23,26,23,1);      (*y-axis scale marks*)
   I:= 23;
(*Grouping of 4 horizontal lines to identify background color
 used for one of the symbols*)
   repeat
      draw(31,I,300,I,0);
      draw(31,I+1,300,I+1,1);
      draw(31,I+2,300,I+2,2);
      draw(31,I+3,300,I+3,3);
      I:=I+12;
   until I > 75;
   KXDIV2 := round(kx / 2);

(*Decode symbols and assign color*)
   for I := 0 TO KXDIV2 do
      begin
       if (XREAL^[I] >= 0) and (XIMAG^[I] > 0) then
          COLOR := 0;
       if (XREAL^[I] < 0) and (XIMAG^[I] > 0) then
          COLOR := 1;
       if (XREAL^[I] < 0) and (XIMAG^[I] <= 0) then
          COLOR := 2;
       if (XREAL^[I] >= 0) and (XIMAG^[I] <= 0) then
          COLOR := 3;

(*zoom spectrum*)

if (I >= k1) and (I <= k2) then
        begin
         XZ := round(((I * 4096.0) / kx) - 1040);
         YZ := 80 - round(0.5*(sqrt(sqr(XREAL^[I]) + sqr(XIMAG^[I]))));
         draw(XZ,80,XZ,YZ,COLOR);
        end;

(*full spectrum*)

X := round(I/KXDIV2 * 256 +30);
       Y :=170-round(20*ln(sqrt(sqr(XREAL^[I]+1)+
                         sqr(XIMAG^[I]+1)))/ln(10));
       draw(X,170,X,Y,COLOR);
      end;
end; (*GraphData*)
(*---------------------------------------------------------------*)
begin
   INVERSE := false;    (*sets forward FFT*)
   ERROR := 0;
   GetData;
   NUMPTS := kx;
   writeln('Performing FFT');
   ComplexFFT (NUMPTS,INVERSE,XREAL,XIMAG,ERROR);
   writeln('Error = ',ERROR,' hit the enter key');readln;

PutData;

GraphData;
```

```
end; (*Tinput*)
(*------------------------------------------------------------------*)
(*------------------------------------------------------------------*)

begin
   repeat
      clrscr;
      assign(THEFILE,'HOUTFA1.DAT');
      rewrite(THEFILE);
      new(XREAL);
      new(XIMAG);
      INVERSE:=true;
      QAM:=false;

SelectBaud;

if QAM then
         DisplayQAM
      else
         DisplayQPSK;

(*Packet contruction loop*)
      for baudcount := 1 to numbauds do
         begin
            if QAM then
               SelectQAM
            else
               SelectQPSK;
            writeln('Performing IFFT');
            ComplexFFT(kx,INVERSE,XREAL,XIMAG,ERROR);
            ScaleData;
         end;(*for BAUDCOUNT*)

dispose(XREAL);
      dispose(XIMAG);
      close(THEFILE);
      BYTECOUNT := NUMBAUDS*kx-1;
      writeln('Press return to transmit');readln;

Dmainit(BCST,BYTECOUNT);

repeat
         writeln('Transmit some more? (*yes or no*) ');
         readln(ANSWER);
      until ANSWER in ['n','N','y','Y'];
      dmastop;
      window(1,1,80,25);
   until ANSWER in ['n','N'];
   Tinput;
end.
```

DMAINIT

```
codeseg segment
        public dmainit
        assume cs:codeseg

;procedure DMAINIT ( BLKADDRESS : XMITPOINTER;
;                    BYTECOUNT : INTEGER);
;
;this procedure initializes dma channel 3 and sets the
;parameters to output the array bcst by passing the address
;of the array start on the stack. BYTECOUNT is the number
;of bytes to transfer and is pushed on the stack by the
;calling program dma     equ     0
        dmapage equ     80h dmainit proc. near
        push    bp
        mov     bp,sp                ;use bp to address stack
        les     di,dword ptr[bp+6]   ;move add of bcst into es:di
        mov     al,5bh               ;dma chan 3 single mode, read, autoinit
        out     dma+11,al
        out     dma+12,al            ;reset first/last ff
        mov     ax,es                ;calc high order 4 bits of buffer area
        mov     cl,4
        rol     ax,cl
        push    ax                   ;save ax for dma start addr
        and     al,0fh
        out     dmapage+2,al         ;store in ch 3 dma page reg
        pop     ax
        and     al,0f0h
        add     ax,di                ;get page offset
        out     dma+6,al             ;output waveform buffer start addr
        mov     al,ah
        out     dma+6,al
        mov     ax,[bp+4]            ;output dma byte count
        out     dma+7,al
        mov     al,ah
        out     dma+7,al
        mov     al,3                 ;unmask ch 3 to start
        out     dma+10,al
        pop     bp
        ret     6                    ;pop 6 bytes off stack for addr of bcst dmainit endp
codeseg ends
```

APPENDIX B XMITMES

```
program XMITMES;
(*Transmits a syncbaud and message from file 'MESSAGE.DAT'. The message
 is encoded using QPSK. 'MESSAGE.DAT' is a text file. It should already
 exist before using this program. Output is used to collect data for
 TESTING*)

const
   FIRST_ELEMENT = -28929;

type
   TNvector = array[0..4095] of real;
   TNvectorPtr = ^TNvector;
   (*Sync + 61440*)
   BCSTARRAY = array[FIRST_ELEMENT..32767] of byte;

var
   kx,
   k1,k2,I,w,
   NUMBAUDS,MAXNUMBAUDS,
   BAUDCOUNT,BYTECOUNT,
   SYMBOLCOUNT,MAXNUMCHAR,
   MESSAGESIZE              : integer;
   MAGNITUDE,
   CHARACTERS_PER_BAUD      : real;
   XREAL,XIMAG              : TNvectorPtr;
   INVERSE                  : boolean;
   TEMPBYTE,ERROR           : byte;
   BCST                     : BCSTARRAY;
   BYTEFILE                 : file of byte;
   TESTFILE                 : text;
   ANSWER,
   NEXTCHAR                 : char;

(*$I FFT87B2.INC*)
(*$I COMPFFT.INC*)

(*----------------------------------------------------------------------*)
procedure SyncBaud;
(*Process the synchronization baud and stores the 256 point time domain
 sequence at the beginning of the packet storage area.*)

var
    SYNCREAL, SYNCIMAG  : TNvectorPtr;
    J, TEMP             : integer;
    SYNCDATA            : byte;
    SYNCMAG             : real;

begin
   new(SYNCREAL);
   new(SYNCIMAG);
   SYNCMAG:= MAGNITUDE;

(*load synchronization symbols*)
   fillchar(SYNCREAL^,sizeof(SYNCREAL^),0);
   fillchar(SYNCIMAG^,sizeof(SYNCIMAG^),0);
   SYNCREAL^[68]:= -SYNCMAG;  SYNCIMAG^[68]:= -SYNCMAG;
   SYNCREAL^[69]:= -SYNCMAG;  SYNCIMAG^[69]:= -SYNCMAG;
   SYNCREAL^[70]:= -SYNCMAG;  SYNCIMAG^[70]:=  SYNCMAG;
```

```
        SYNCREAL^[71]:= -SYNCMAG;  SYNCIMAG^[71]:=  SYNCMAG;
        SYNCREAL^[72]:=  SYNCMAG;  SYNCIMAG^[72]:= -SYNCMAG;
        SYNCREAL^[73]:=  SYNCMAG;  SYNCIMAG^[73]:=  SYNCMAG;
        SYNCREAL^[74]:= -SYNCMAG;  SYNCIMAG^[74]:=  SYNCMAG;
        SYNCREAL^[75]:=  SYNCMAG;  SYNCIMAG^[75]:=  SYNCMAG;
        SYNCREAL^[76]:= -SYNCMAG;  SYNCIMAG^[76]:=  SYNCMAG;
        SYNCREAL^[77]:= -SYNCMAG;  SYNCIMAG^[77]:= -SYNCMAG;
        SYNCREAL^[78]:=  SYNCMAG;  SYNCIMAG^[78]:= -SYNCMAG;
        SYNCREAL^[79]:= -SYNCMAG;  SYNCIMAG^[79]:= -SYNCMAG;
        SYNCREAL^[80]:=  SYNCMAG;  SYNCIMAG^[80]:=  SYNCMAG;
        SYNCREAL^[81]:=  SYNCMAG;  SYNCIMAG^[81]:= -SYNCMAG;
        SYNCREAL^[82]:= -SYNCMAG;  SYNCIMAG^[82]:= -SYNCMAG;
        SYNCREAL^[83]:=  SYNCMAG;  SYNCIMAG^[83]:=  SYNCMAG;

(*complex conjugate image*)
        for J := 68 to 83 do
            begin
                SYNCREAL^[256-J]:= SYNCREAL^[J];
                SYNCIMAG^[256-J]:=-SYNCIMAG^[J];
            end;(*for J*)

ComplexFFT(256,INVERSE,SYNCREAL,SYNCIMAG,ERROR);

(*scale data/load time sequence*)
        for J := 0 to 255 do
            begin
                TEMP:=round(SYNCREAL^[J] + 126);
                if TEMP < 0 then
                    TEMP:=0;
                SYNCDATA:=TEMP;
                BCST[J+FIRST_ELEMENT]:=SYNCDATA;
            end;(*for J*)
        dispose(SYNCREAL);
        dispose(SYNCIMAG);
end;(*SyncBaud*)
(*-------------------------------------------------------------------*)
(*-------------------------------------------------------------------*)
procedure SelectBaud;
(*SelectBaud establishes kx, k1, and k2*)

var
    ANSWER : integer;

begin
    kx:=0;
    (*select baud size*)
    repeat
        if kx < 0 then writeln('TRY AGAIN');
        writeln('What is the length of the bauds (kx)?');
        writeln('i.e. 256, 512, 1024, 2048, 4096');
        readln(ANSWER);
        case ANSWER of
            256:  kx:=256;
            512:  kx:=512;
            1024: kx:=1024;
            2048: kx:=2048;
            4096: kx:=4096;
        end; (*case ANSWER*)
        if kx = 0 then kx := -1;
    until kx > 0;
```

```
   (*set tone limits*)
   case kx of
      256: begin
            k1:=68; k2:=83;
         end;
      512: begin
            k1:=135; k2:=166;
         end;
      1024: begin
            k1:=269; k2:=332;
         end;
      2048: begin
            k1:=537; k2:=664;
         end;
      4096: begin
            k1:=1073; k2:=1328;
         end;
      end; (*case kx*)
end; (*SelectBaud*)
(*------------------------------------------------------------------*)
(*------------------------------------------------------------------*)
procedure TailorPacket;
(*TailorPacket sets the maximum number of baud required to encode the
 message*)

begin
   MESSAGESIZE:= filesize(BYTEFILE);
   writeln('Message is ',MESSAGESIZE,' bytes.');

(*kx/2 is the number of bit/baud for QPSK. kx/2-2 is the number
     for DQPSK. Each character is 8 bits*)
   CHARACTERS_PER_BAUD:=(kx/8 - 2)/8;

(*61440/kx is maximum number of bauds possible*)
   MAXNUMCHAR:= trunc(61440.0/kx * CHARACTERS_PER_BAUD);
   if MESSAGESIZE > MAXNUMCHAR then
      begin
         writeln('Message is to large. The last ',
                  MESSAGESIZE - MAXNUMCHAR,
                  ' characters will not be transmitted.');
         MESSAGESIZE:=MAXNUMCHAR;
      end;

MAXNUMBAUDS:=trunc(MESSAGESIZE / CHARACTERS_PER_BAUD);

(*ensure last few characters are included*)
   if frac(MESSAGESIZE / CHARACTERS_PER_BAUD) > 0.0 then
      MAXNUMBAUDS:=MAXNUMBAUDS + 1;

repeat
      writeln;
      writeln('Enter number of ',kx,' bauds to process.   ',
               MAXNUMBAUDS,' is the maximum.');
      readln(NUMBAUDS);
   until NUMBAUDS in [1..MAXNUMBAUDS];
end; (*TailorPacket*)
(*------------------------------------------------------------------*)
(*------------------------------------------------------------------*)
procedure DiffEncode;
(*DiffEncode differential encodes symbols on a tone-to-tone basis.
 BYTEFILE is read from one byte at a time. The byte is isolated into
```

2-bit groups and stored in BITS. BITS is then used to DQPSK encode the frequency domain arrays XREAL and XIMAG. Bytes partially encoded are carried over into the next baud by global variable TEMPBYTE.*)

```
var
   J      : integer;
   BITS   : byte;

begin
   fillchar(XREAL^,sizeof(XREAL^),0);
   fillchar(XIMAG^,sizeof(XIMAG^),0);

(*first tone of every baud set to pi/2*)
   XREAL^[k1]:= MAGNITUDE;
   XIMAG^[k1]:= MAGNITUDE;

if SYMBOLCOUNT = 0 then
        read(BYTEFILE,TEMPBYTE);

(*break apart character*)
   for J:= (k1 + 1) to k2 do
      begin
         SYMBOLCOUNT:=SYMBOLCOUNT + 1;
         if frac(SYMBOLCOUNT / 4) = 0.25 then
            BITS:= (TEMPBYTE and $C0) shr 6;
         if frac(SYMBOLCOUNT / 4) = 0.5 then
            BITS:= (TEMPBYTE and $30) shr 4;
         if frac(SYMBOLCOUNT / 4) = 0.75 then
            BITS:= (TEMPBYTE and $0C) shr 2;
         if frac(SYMBOLCOUNT / 4) = 0.0 then
            begin
               BITS:= TEMPBYTE and $03;
               if not EOF(BYTEFILE) then
                  read(BYTEFILE,TEMPBYTE)
               else
                  TEMPBYTE:=$40;(*fill character*)
            end;
         if (BITS < 0) and (BITS > 3) then
            writeln('Bits not assigned properly');
(*differential encode*)
         case BITS of
            0: begin XREAL^[J]:= XREAL^[J-1];
                     XIMAG^[J]:= XIMAG^[J-1]; end;
            1: begin XREAL^[J]:=-XIMAG^[J-1];
                     XIMAG^[J]:= XREAL^[J-1]; end;
            2: begin XREAL^[J]:= XIMAG^[J-1];
                     XIMAG^[J]:=-XREAL^[J-1]; end;
            3: begin XREAL^[J]:=-XREAL^[J-1];
                     XIMAG^[J]:=-XIMAG^[J-1]; end;
         end;(*case BITS*)
      end;(*for J*)

(*complex conjugate image*)
   for J:= k1 to k2 do
      begin
         XREAL^[kx - J]:= XREAL^[J];
         XIMAG^[kx - J]:=-XIMAG^[J];
         writeln(TESTFILE,BAUDCOUNT:4,J:5,trunc(XREAL^[J]):6,
                          trunc(XIMAG^[J]):6);
      end;
end;(*DiffEncode*)
```

```
(*------------------------------------------------------------------*)
(*------------------------------------------------------------------*)
procedure ScaleData;
(*ScaleData converts each real value in XREAL down to a byte and stores
 the byte in the packet storage buffer, BCST. INDEX establishes the
 location in the buffer of each byte in the packet.*)

var
    INDEX,J,TEMP   : integer;
    DATA           : byte;

begin
    for J := 0 to kx-1 do
        begin
            TEMP := round(XREAL^[J] + 126);
            if TEMP < 0 then
                TEMP := 0;
            DATA := TEMP;
        (*256 is added to INDEX to start message bauds
          after the sync baud*)
            INDEX := J+(BAUDCOUNT-1)*kx+FIRST_ELEMENT+256;
            BCST[INDEX] := DATA;
        end;(*for J*)
end; (*ScaleData*)
(*------------------------------------------------------------------*)
(*------------------------------------------------------------------*)
procedure Dmainit(var BCST : BCSTARRAY;
                  BYTECOUNT : integer);
(*Assembly language procedure used to initialize and unmask the DMA for
 data transfer. The source code must be converted to a BIN file.*)

external 'DMAINIT5.BIN';
(*------------------------------------------------------------------*)
procedure Dmastop;
(*Masks DMA, stopping data transfer.*)
external 'DMASTOP.BIN';
(*------------------------------------------------------------------*)
(*------------------------------------------------------------------*)
begin
    clrscr;

(*contains hex values to be encoded and transmitted*)
    assign(BYTEFILE,'MESSAGE.DAT');
    reset(BYTEFILE);

(*Output file of encoded symbols. Used for system testing*)
    assign(TESTFILE,'XMITDAT.DAT');
    rewrite(TESTFILE);

INVERSE:=true;
    repeat
     writeln('Enter magnitude of tones.(must be > 0.0) ');
     readln(MAGNITUDE);
    until MAGNITUDE > 0.0;

writeln('Loading sync baud.');
    SyncBaud;

SelectBaud;
    TailorPacket;
```

```
   SYMBOLCOUNT:=0;
   TEMPBYTE:=$00;
   writeln('Number of bauds is ',numbauds);
   new(XREAL);
   new(XIMAG);

for baudcount := 1 to numbauds do
       begin
           DiffEncode;
           writeln('Performing IFFT ',BAUDCOUNT,' ',
                   NUMBAUDS-BAUDCOUNT,' left');
           ComplexFFT(kx,INVERSE,XREAL,XIMAG,ERROR);
           ScaleData;
       end;(*for BAUDCOUNT*)

dispose(XREAL);
   dispose(XIMAG);
   close(BYTEFILE);
   close(TESTFILE);
   BYTECOUNT := 256 + NUMBAUDS*kx - 1;

repeat
   writeln('Press return to transmit');readln;
   Dmainit(BCST,BYTECOUNT);
   repeat
       writeln('Transmit some more? (*yes or no*) ');
       readln(ANSWER);
   until ANSWER in ['n','N','y','Y'];
       dmastop;
   until ANSWER in ['n','N'];

(*  reset(TESTFILE);
    while not EOF(TESTFILE) do
        begin
            while not EOLN(TESTFILE) do
                begin
                    read(TESTFILE,NEXTCHAR);
                    write(NEXTCHAR);
                end;
            readln(TESTFILE);
            writeln;
        end;
    close(TESTFILE);*)
end.
```

DMAINIT

```
codeseg segment
        public dmainit
        assume cs:codeseg

;procedure DMAINIT ( BLKADDRESS : XMITPOINTER;
;                    BYTECOUNT : INTEGER);
;
;this procedure initializes dma channel 3 and sets the
;parameters to output the array bcst by passing the address
;of the array start on the stack. BYTECOUNT is the number
;of bytes to transfer and is pushed on the stack by the
;calling program dma     equ     0
        dmapage equ     80h dmainit proc. near
        push    bp
        mov     bp,sp           ;use bp to address stack
        les     di,dword ptr[bp+6] ;move add of bcst into es:di
        mov     al,5bh          ;dma chan 3 single mode, read, autoinit
        out     dma+11,al
        out     dma+12,al       ;reset first/last ff
        mov     ax,es           ;calc high order 4 bits of buffer area
        mov     cl,4
        rol     ax,cl
        push    ax              ;save ax for dma start addr
        and     al,0fh
        out     dmapage+2,al    ;store in ch 3 dma page reg
        pop     ax
        and     al,0f0h
        add     ax,di           ;get page offset
        out     dma+6,al        ;output waveform buffer start addr
        mov     al,ah
        out     dma+6,al
        mov     ax,[bp+4]       ;output dma byte count
        out     dma+7,al
        mov     al,ah
        out     dma+7,al
        mov     al,3            ;unmask ch 3 to start
        out     dma+10,al
        pop     bp
        ret     6               ;pop 6 bytes off stack for addr of bcst dmainit endp
codeseg ends
```

APPENDIX C RECMES

```pascal
program RECEIVER;
(*Acquires the signal. Stores it in a memory buffer. Differential decodes
 between tones. Maximum number of bauds are received. The number of
 bauds processed is a user input*)

uses Graph, Crt, tp4d16;

(*$I-*)
(*$R-*)

const MAX_BUFFER = 65500;

type
    TNvector  = array-0..4096- of real; (*TYPE for real and imaginary data
                                                  for FFT routing*)
    TNvectorPtr = ^TNvector;            (*Pointer for FFT data array which
                                          allows dynamic allocation of memory*)

var
  INVERSE         : boolean;
  XREAL, XIMAG    : TNvectorPtr;
  ERROR, TEMPBYTE : byte;
  J,
  k1,k2,kx,ANSWER,
  ERR_CODE, BAUDCOUNT,
  SYMBOLCOUNT,
  NUMBAUDS,
  MAXNUMBAUDS     : integer;
  MAGNITUDE,
  PHASE           : real;
  DATAVECTOR      : ^integer;
  DMAPOINTER      : pointer;
  TESTFILE,
  OUTFILE         : TEXT;

(*$I FFT87B2.INC*)
(*$I COMPFFT.INC*)
(*-----------------------------------------------------------------------*)
(*-----------------------------------------------------------------------*)
procedure PacketSetUp;

begin
   repeat
      clrscr;
      if kx < 0 then writeln('TRY AGAIN');
      writeln('Enter baud size ');
      readln(ANSWER);
      case ANSWER of
          256:  kx:= 256;
          512:  kx:= 512;
          1024: kx:=1024;
          2048: kx:=2048;
          4096: kx:=4096;
      end;(*case*)
      if kx = 0 then kx := -1;
   until kx > 0;
   MAXNUMBAUDS := trunc((MAX_BUFFER/2)/kx);
```

```
   repeat
      writeln;
      writeln('Enter number of ',kx,' bauds to process. ',
              MAXNUMBAUDS,' is the maximum.');
      readln(NUMBAUDS);
   until NUMBAUDS in [1..MAXNUMBAUDS];

k1 := round(kx * 67.0 / 256.0 + 1);
   k2 := round(kx * 83.0 / 256.0);
end;   (*PacketSetUp*)
(*--------------------------------------------------------------*)
(*--------------------------------------------------------------*)
procedure AcquireData;
(*AcquireData initializes Metrobyte DASH-16F data acquisition board,
  using TTOOLS procedure D16_int and D16_ainm. Data transfer is
  controlled by the DMA controller and initialized by D16_ainm and
  disabled by D16_dma_int_disable. TTOOLS procedures are external
  procedures included by 'uses' tp4d16.*)

var
    RATE:  real;
    I,CNT_NUM, MODE, CYCLE, TRIGGER,
    BASE_ADR, INT_LEVEL, DMA_LEVEL,
    BOARD_NUM, CHANLO,
    OP_TYPE, STATUS, NEXT_CNT, ERR_CODE_S :        integer;

begin
    BOARD_NUM := 0;  INT_LEVEL := 7;   DMA_LEVEL := 1;
    BASE_ADR := $300;

D16_init(BOARD_NUM,BASE_ADR,INT_LEVEL,DMA_LEVEL,ERR_CODE);

CHANLO := 0;
    CYCLE:=0;     (*0-one sweep of the DMA  1-autoinitialize*)
    TRIGGER:=0;   (*0 - external  1 - internal*)
    CNT_NUM:=trunc(MAX_BUFFER / 2); (*# of samples*)
    RATE := 10000.0;(*used for internal trigger*)
    MODE := 2;    (*DMA mode*)
    writeln('Ready to acquire');

D16_ainm(BOARD_NUM,CHANLO,MODE,CYCLE,TRIGGER,CNT_NUM,
             RATE, DATAVECTOR^,ERR_CODE);

STATUS := 11;

(*status indicates the progress of acquisition. When all
     samples have been acquired status=0*)
    repeat
       D16_dma_int_status(BOARD_NUM,OP_TYPE,STATUS,NEXT_CNT, ERR_CODE_S);
    until STATUS = 0;
    writeln('Data received');

if ERR_CODE <> 0 then
        D16_print_error(ERR_CODE);
    D16_dma_int_disable(BOARD_NUM,ERR_CODE);

end; (*Acquire*)
(*--------------------------------------------------------------*)
(*--------------------------------------------------------------*)
procedure ConvertData;
(*ConvertData seperates channel and acquired data. CHAN_DATA is not used.
  Acquired data is stored in XREAL.*)
```

```
var
    AD_DATA:    array[0..4096] of integer;
    I,CHAN_DATA,ERR_CODE,
    SEGMENTPART,OFFSETPART: integer;
    NEWDATAVECTOR          : ^integer;
    TEMPPOINTER            : pointer;

begin
    writeln('Processing baud ',BAUDCOUNT);
    fillchar(XREAL^,sizeof (XREAL^),0);
    fillchar(XIMAG^,sizeof (XIMAG^),0);
    SEGMENTPART:=seg(DATAVECTOR^);
    OFFSETPART:=ofs(DATAVECTOR^) + 2 * kx * (BAUDCOUNT - 1);
    TEMPPOINTER:=ptr(SEGMENTPART,OFFSETPART);
    NEWDATAVECTOR := TEMPPOINTER;
    d16_convert_data(2047,kx,NEWDATAVECTOR^,AD_DATA[0],
                     CHAN_DATA,0,ERR_CODE);

for I:= 0 to (kx - 1) do
      begin
        XREAL^[I] := AD_DATA[I]/5;
      end;
end; (*ConvertData*)
(*------------------------------------------------------------------*)
procedure DiffDecode;
(*DiffDecode differentially decodes complex frequency domain arrays XREAL
 and XIMAG. Four decoded symbols are recombined into a byte and
 transferred to file BYTESOUT.DAT.*)

var
    I                   : integer;
    TEMPREAL,TEMPIMAG   : real;
    BITS                : byte;
    TEMPCHAR            : char;

begin for I := k1 to (k2 - 1) do
      begin
(*Complex multiply two adjacent tones, I and the complex conjugate of I+1.
 This will give the phase difference between the two tones. The answer
 is in rectangular notation*)
        TEMPREAL:=XREAL^[I] * XREAL^[I+1] + XIMAG^[I] * XIMAG^[I+1];
        TEMPIMAG:=XREAL^[I] * XIMAG^[I+1] - XREAL^[I+1] * XIMAG^[I];

(*Complex multiply (TEMPREAL + j TEMPIMAGE) and (1+j). This rotates the
 differential vector pi/4 radians. XREAL and XIMAG are used to store
 the results. This eliminate the original data*)
        XREAL^[I]:=(TEMPREAL - TEMPIMAG)/80;
        XIMAG^[I]:=(TEMPREAL + TEMPIMAG)/80;

(*decode*)
        if (XREAL^[I] >= 0) and (XIMAG^[I] > 0) then
            BITS:=$00;
        if (XREAL^[I] < 0) and (XIMAG^[I] > 0) then
            BITS:=$01;
        if (XREAL^[I] < 0) and (XIMAG^[I] <= 0) then
            BITS:=$03;
        if (XREAL^[I] >= 0) and (XIMAG^[I] <= 0) then
            BITS:=$02;
        SYMBOLCOUNT := SYMBOLCOUNT + 1;
```

```
        (*fill TEMPBYTE with four symbols*)
        if frac(SYMBOLCOUNT / 4) = 0.25 then
           TEMPBYTE := (BITS shl 6);
        if frac(SYMBOLCOUNT / 4) = 0.5 then
           TEMPBYTE := (BITS shl 4) or TEMPBYTE;
        if frac(SYMBOLCOUNT / 4) = 0.75 then
           TEMPBYTE := (BITS shl 2) or TEMPBYTE;
        if (frac(SYMBOLCOUNT / 4) = 0.0) then
           begin
               TEMPBYTE := BITS or TEMPBYTE;
               TEMPCHAR := chr(TEMPBYTE);
               write(OUTFILE,TEMPCHAR);
               TEMPBYTE:=0;
           end; (*if frac*)
     end; (*for I*)

XREAL^[k2]:=1.0;
     XIMAG^[k2]:=1.0;

end; (*DiffDecode*)
(*------------------------------------------------------------------*)
procedure Showmessage;
(*Showmessage reads in decoded message*)

var
   NEXTCHAR: char;

begin
   writeln;
   writeln('The message transmitted is..');
   assign(OUTFILE,'MESSAGE.DAT');
   reset(OUTFILE);
   while not EOF(OUTFILE) do
      begin
         while not EOLN(OUTFILE) do
            begin
               read(OUTFILE,NEXTCHAR);
               write(NEXTCHAR);
            end;(*while not EOLN*)
         readln(OUTFILE);
         writeln;
      end;(*while not EOF*)
   close(OUTFILE);
end;(*Showmessage*)
(*------------------------------------------------------------------*)

begin (*main body*)
   GetDMABuffer(MAX_BUFFER,DMAPOINTER,ERR_CODE);

DATAVECTOR := DMAPOINTER;  (*This statement assigns a generic pointer
                              to a variable of a specific pointer type,
                              i.e. ^integer, so that the pointer can be
                              passed to the d16_ainm routine.*)

new(XREAL);
   new(XIMAG);

INVERSE := false;                   (*sets forward FFT*)
   ERROR := 0;
   kx:=0;
```

```
PacketSetUp;

(*received message output file*)
   assign(OUTFILE,'MESSAGE.DAT');
   rewrite(OUTFILE);

(*RECSTAT file shows the computed real and imaginary values of the
 received signal and its decoded representation*)
   assign(TESTFILE,'RECSTAT.DAT');
   rewrite(TESTFILE);
(*   writeln(TESTFILE,'Baudlength is',kx:5);*)

SYMBOLCOUNT:=0;
   TEMPBYTE:=0;

AcquireData;    (*AcquireData samples input analog signal*)

for BAUDCOUNT := 1 to NUMBAUDS do
      begin
         ConvertData;
         ComplexFFT (kx,INVERSE,XREAL,XIMAG,ERROR);
(*         writeln(TESTFILE,'Baud':11,'Tone':5,'Real':10,
                     'Imaginary':10,'Mag':10,'Phase':8);*)
         for J:=k1 to k2 do
            begin
               MAGNITUDE:=20*ln(sqrt(sqr(XREAL^[J])+
                           sqr(XIMAG^[J]))) / ln(10);

if (XREAL^[J] >= 0) then
                  PHASE:=arctan(XIMAG^[J] / XREAL^[J]);
               if (XREAL^[J] < 0) and (XIMAG^[J] > 0) then
                  PHASE:=Pi + arctan(XIMAG^[J] / XREAL^[J]);
               if (XREAL^[J] < 0) and (XIMAG^[J] <= 0) then
                  PHASE:=arctan(XIMAG^[J] / XREAL^[J]) - Pi;

writeln(TESTFILE,'R',BAUDCOUNT:4,J:5,
                           XREAL^[J]:10:4,XIMAG^[J]:10:4,
                           MAGNITUDE:10:4,PHASE:8:4);
            end;

DiffDecode;

for J:=k1 to k2 do
            begin
               MAGNITUDE:=sqrt(sqr(XREAL^[J])+sqr(XIMAG^[J]));
               writeln(TESTFILE,'D',BAUDCOUNT:4,J:5,
                           XREAL^[J]/MAGNITUDE:10:4,
                           XIMAG^[J]/MAGNITUDE:10:4);
            end;
      end;

writeln(OUTFILE,chr(TEMPBYTE));

close(OUTFILE);
   close(TESTFILE);
   dispose(XREAL);
   dispose(XIMAG);
   FreeDMABuffer(MAX_BUFFER,DMAPOINTER,ERR_CODE);
   Showmessage;
(*  writeln('Error = ',ERROR,'  hit the enter key');readln;*)
end.
```

I claim:

1. A data-driven, two-stage echo cancellation circuit for use in a full duplex communications system which encodes and decodes transmission signal data in the time domain and the frequency domain, said echo cancellation circuit comprising:
    a first stage for generating a first estimate of an echo signal utilizing transmission signal data in the time domain, said first estimate of an echo signal subtracted from a received analog signal; and
    a second stage for generating a second estimate of residual echo signal utilizing transmission signal data in the frequency domain, said second estimate subtracted from said received signal after said received signal has been converted to a digital signal in the frequency domain.

2. An echo cancellation circuit as in claim 1 wherein said first stage comprises:
    a linear filter having an input for receiving said transmission signal data, said linear filter generating said first estimate of an echo signal in digital form;
    a digital-to-analog converter coupled to an output of said linear filter for converting said digital first estimate to an analog form; and
    a summer circuit coupled to an output of said digital-to-analog converter and to said communications channel, said summer circuit for subtracting said first estimate from said received analog signal.

3. An echo cancellation circuit as in claim 2 wherein said second stage comprises:
    a multiplier circuit having first and second inputs, said first input for receiving said transmission signal in the frequency domain, said second input for receiving complex weighting coefficients, said transmission signal multiplied with said weighting coefficients for generating said second estimate of said residual echo signal; and
    a summer circuit coupled to an output of said multiplier circuit and to said communications channel, said summer circuit for subtracting said second estimate of residual echo signal from said digital received signal in the frequency domain.

4. An echo cancellation circuit as in claim 2 wherein said linear filter comprises a finite impulse response linear filter implementing a weighting function, h(i), defined by the following equation:

$$h^{n+1}(i) = h^n(i) + k_x^{-1}(r(n)x(n-i))$$

i=0,1 ... N−1, n=0,1 ... $k_x$−1
where i=the number of filter coefficients, N=one of a number of filter coefficients, n=the number of sample points in a baud of said transmission signal, $k_x$=one of a number of digital signal samples, r(n)=the receive time domain digital signal sequence and x(n)=the transmit time domain digital signal sequence.

5. An echo cancellation circuit as in claim 3 wherein said complex weighting coefficients, C(k), are defined by the following equation:

$$C(k) = \sum_{n=0}^{k_x-1} R_1(k) X_1^*(k) / \sum_{n=0}^{k_x-1} |X_1(k)|^2,$$

$k = k_1 \ldots k_2$, where $k$ = the number of sample points in a baud of said transmission signal, $X_1(k)$=values in the transmit frequency domain array and $R_1(k)$=values in the receive frequency domain array.

* * * * *